(12) United States Patent
Asai

(10) Patent No.: US 9,963,071 B2
(45) Date of Patent: May 8, 2018

(54) ELECTRONIC MIRROR APPARATUS

(71) Applicant: TOYOTA JIDOSHA KABUSHIKI KAISHA, Toyota-shi, Aichi-ken (JP)

(72) Inventor: Goro Asai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 14/933,751

(22) Filed: Nov. 5, 2015

(65) Prior Publication Data

US 2016/0185292 A1 Jun. 30, 2016

(30) Foreign Application Priority Data

Dec. 26, 2014 (JP) .................................. 2014-266325

(51) Int. Cl.
*B60R 1/00* (2006.01)
*H04N 7/18* (2006.01)

(52) U.S. Cl.
CPC ............... *B60R 1/00* (2013.01); *H04N 7/181* (2013.01); *B60R 2300/105* (2013.01); *B60R 2300/70* (2013.01); *B60R 2300/8046* (2013.01)

(58) Field of Classification Search
CPC ............... B60R 1/00; B60R 2300/105; B60R 2300/8046; B60R 2300/70; H04N 7/181
See application file for complete search history.

(56) References Cited

U.S. PATENT DOCUMENTS

| 5,372,754 A | 12/1994 | Ono | |
|---|---|---|---|
| 2010/0231715 A1* | 9/2010 | Garner | B60R 1/00 348/148 |
| 2012/0133768 A1* | 5/2012 | Stephan | B60R 1/00 348/148 |
| 2012/0320213 A1* | 12/2012 | Ikeda | B60R 1/00 348/148 |
| 2015/0310285 A1* | 10/2015 | Ogata | B60R 1/00 382/104 |

FOREIGN PATENT DOCUMENTS

| EP | 2 228 259 A1 | 9/2010 |
|---|---|---|
| JP | 2009-083618 A | 4/2009 |
| WO | 2011/014903 A1 | 2/2011 |

OTHER PUBLICATIONS

Oct. 8, 2015 Office Action issued in U.S. Appl. No. 12/827,815.

* cited by examiner

*Primary Examiner* — Zhihan Zhou
(74) *Attorney, Agent, or Firm* — Oliff PLC

(57) ABSTRACT

An electronic mirror apparatus includes an imaging part mounted at one-side or each of both-side surfaces of a vehicle and taking an image in a rear-and-side directions of the vehicle; and a display part mounted in the vehicle interior and displaying an image taken by the imaging part or an image acquired through a predetermined transform process on the image taken by the imaging part. The display part displays the image corresponding to an imaging range that is different between a case where a shift position of the vehicle is a forward position and a case where the shift position is a reverse position.

5 Claims, 15 Drawing Sheets

NORMAL-CASE DISPLAYED IMAGE

NEAR-REAR-WHEEL DISPLAYED IMAGE

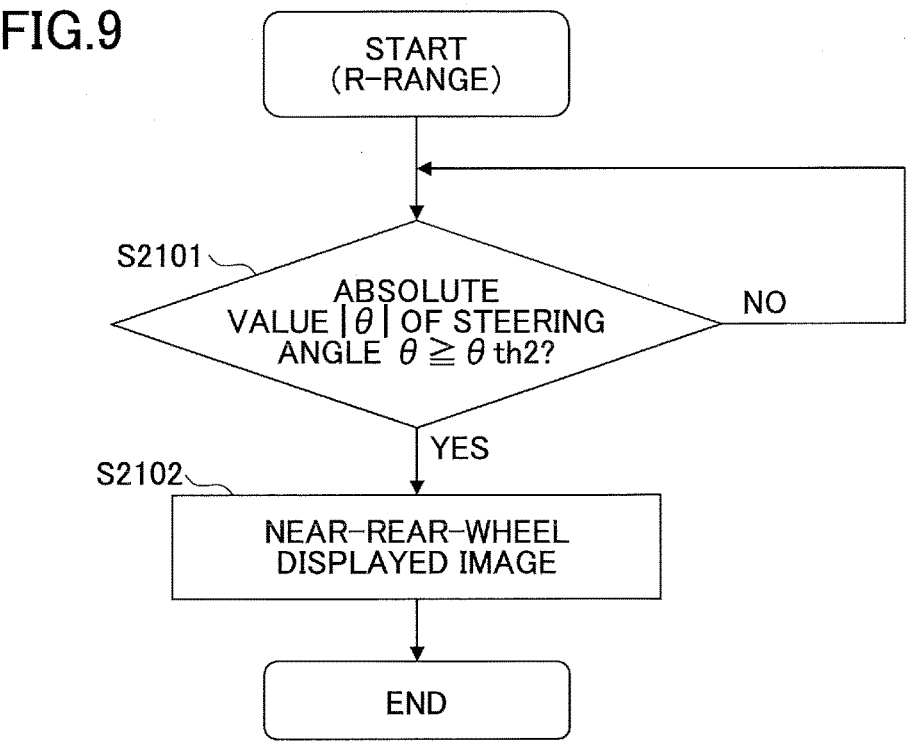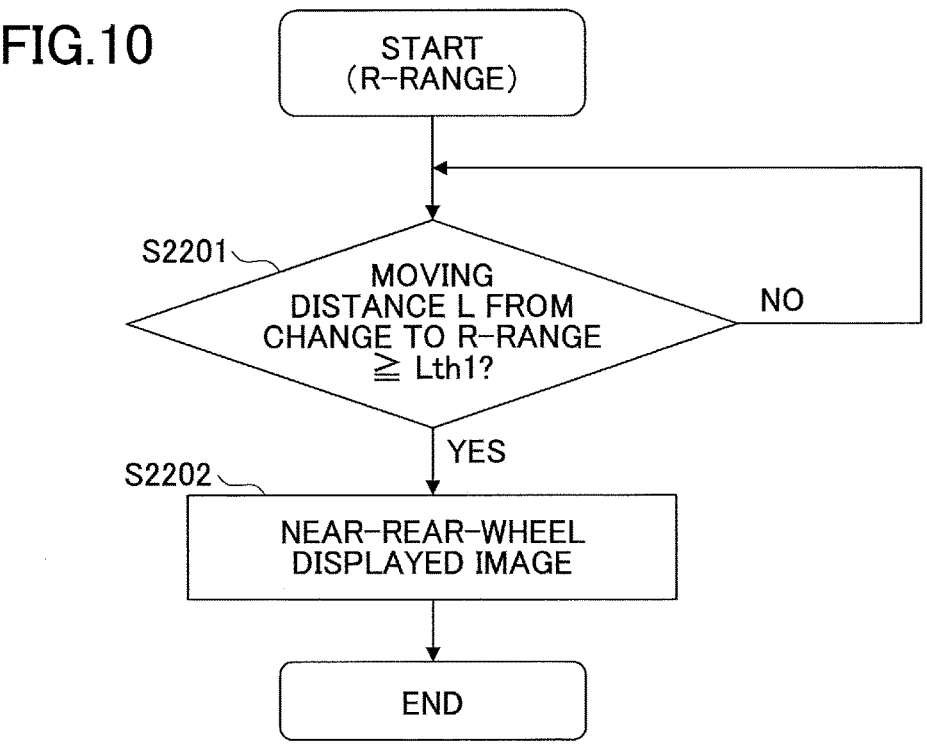

NORMAL-CASE DISPLAYED IMAGE

WHITE-LINE-BIRD'S-EYE-VIEW DISPLAYED IMAGE

ELECTRONIC MIRROR APPARATUS

BACKGROUND OF THE INVENTION

1. Field of the Invention

The present invention relates to an electronic mirror apparatus.

2. Description of the Related Art

In the related art, an electronic mirror apparatus is known which has respective imaging parts taking images in rear-and-side directions on left and right sides (left rear-and-side directions and right rear-and-side directions) of a vehicle, and a display part mounted at such a position that a driver can easily see it and displaying the images taken by the imaging parts (for example, see Japanese Laid-Open Patent Application No. 2009-083618).

By thus installing such an electronic mirror apparatus in a vehicle, it is not necessary to install door mirrors, fender mirrors, or so, for a driver to check rear directions on left and right sides. As a result, it is possible to reduce the fuel consumption by reducing resistance to air of the vehicle, improve the degree of freedom of designing the vehicle, and so forth.

SUMMARY OF THE INVENTION

According to one aspect of the present invention, an electronic mirror apparatus includes an imaging part mounted at one-side or each of both-side surfaces of a vehicle and taking an image in rear-and-side directions of the vehicle; and a display part mounted in the vehicle interior and displaying an image taken by the imaging part or an image acquired through a predetermined transform process on the image taken by the imaging part. The display part displays the image corresponding to an imaging range that is different between a case where a shift position of the vehicle is a forward position and a case where the shift position is a reverse position.

According to another aspect of the present invention, an electronic mirror apparatus includes an imaging part mounted at one-side or each of both-side surfaces of a vehicle and taking an image in rear-and-side directions of the vehicle; and a display part mounted in the vehicle interior and displaying an image taken by the imaging part or an image acquired through a predetermined transform process on the image taken by the imaging part. The display part displays the image corresponding to an imaging range that is different between a case where a shift position of the vehicle is a forward position and a case where the shift position is a reverse position and another condition is satisfied.

Other objects, features and advantages of the present invention will become more apparent from the following detailed description when read in conjunction with the accompanying drawings.

BRIEF DESCRIPTION OF THE DRAWINGS

FIG. 9 is a flowchart conceptually illustrating one example of a process carried out by the electronic mirror apparatus (the processing part) according to the second embodiment;

FIG. 10 is a flowchart conceptually illustrating another example of a process carried out by the electronic mirror apparatus (the processing part) according to the second embodiment;

DETAILED DESCRIPTION OF THE EMBODIMENTS

In many cases, ranges in left rear-and-side directions and right rear-and-side directions of a vehicle that a driver wants to check using such an electronic mirror apparatus as that described above when the vehicle travels in a reverse (backward) direction is different from one when the vehicle travels in the forward direction. Therefore, when the driver causes the vehicle to travel in the reverse direction, it is preferable that the electronic mirror apparatus appropriately changes the ranges in the left rear-and-side directions and the right rear-and-side directions of the vehicle according to ranges that the driver wants to check, or so.

However, Japanese Laid-Open Patent Application No. 2009-083618 mentioned above discloses displaying an image taken by an imaging part, and does not consider that, when the driver causes the vehicle to travel in the reverse direction, an area the driver wants to check is different from one when the vehicle travels in the forward direction.

In consideration of such a situation, an object of embodiments and variants is to provide an electronic mirror apparatus with which it is possible to appropriately change ranges in rear-and-side directions on left and right sides of a vehicle to be displayed by a display device depending on whether the vehicle travels in the forward direction or the reverse direction, and thus improve the convenience of the driver.

Below, with reference to the accompanying drawings, the embodiments and the variants will be described.

[First Embodiment]

First, a configuration of an electronic mirror apparatus 1 according to a first embodiment will be described.

Figure 1:
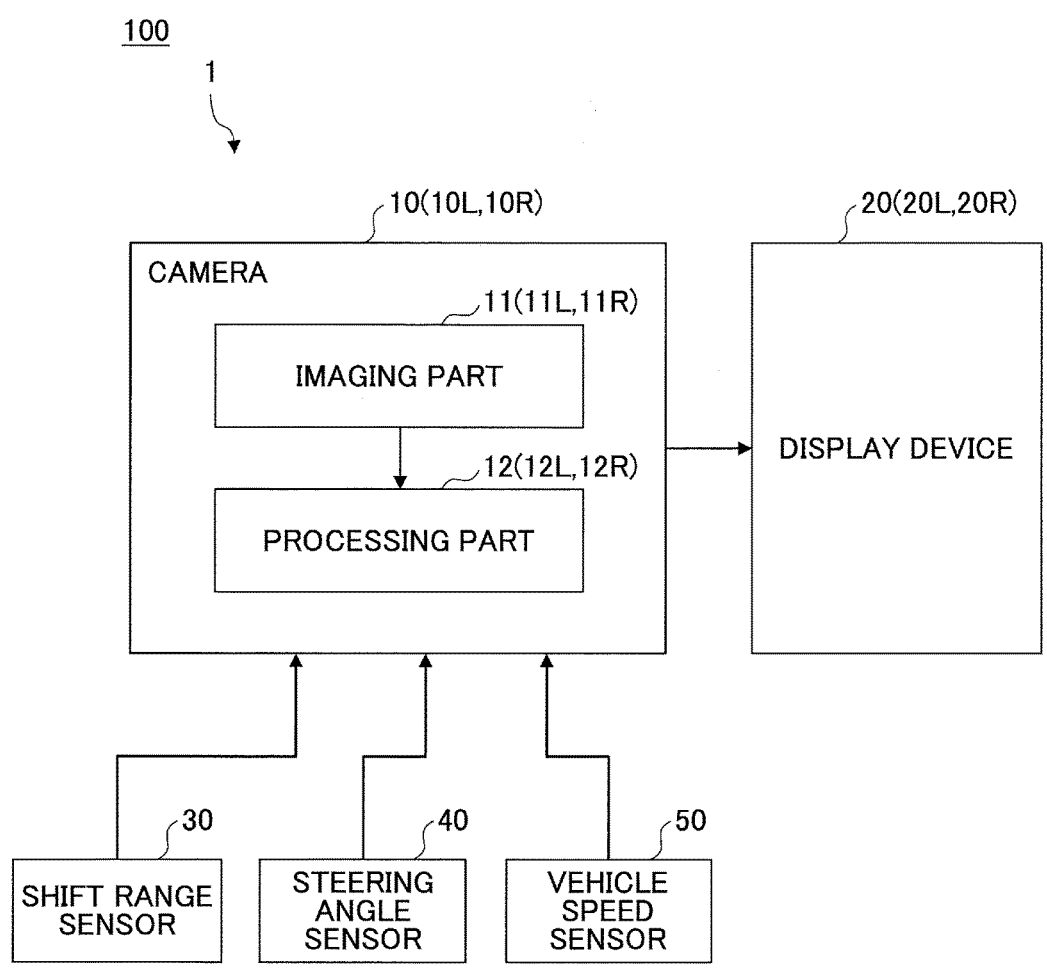
FIG. 1 is a block diagram illustrating one example of a configuration of a vehicle including an electronic mirror apparatus.

FIG. 1 is a block diagram illustrating one example of a configuration of a vehicle 100 including an electronic mirror apparatus 1. The electronic mirror apparatus 1 includes cameras 10 (i.e., 10L and 10R), display devices 20 (i.e., 20L and 20R), a shift range sensor 30, a steering angle sensor 40, a vehicle speed sensor 50, and so forth.

The cameras 10L and 10R act as imaging parts taking images in rear directions and side directions of the vehicle 100 (i.e., rear-and-side directions), and also, act as displayed image generation parts which, based on the taken images, generate images (i.e., displayed images) to be displayed on the display devices 20L and 20R. The cameras 10L and 10R correspond to the left rear-and-side directions and the right rear-and-side directions, respectively, of the vehicle 100. That is, the camera 10L takes an image of the left rear-and-side directions of the vehicle 100, and the camera 10R takes an image of the right rear-and-side directions of the vehicle 100.

Figure 2B:
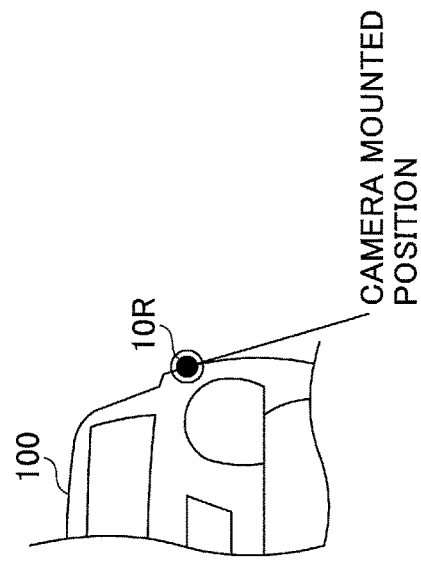
FIGS. 2A and 2B illustrate examples of mounting a camera in a vehicle.
Figure 2A:
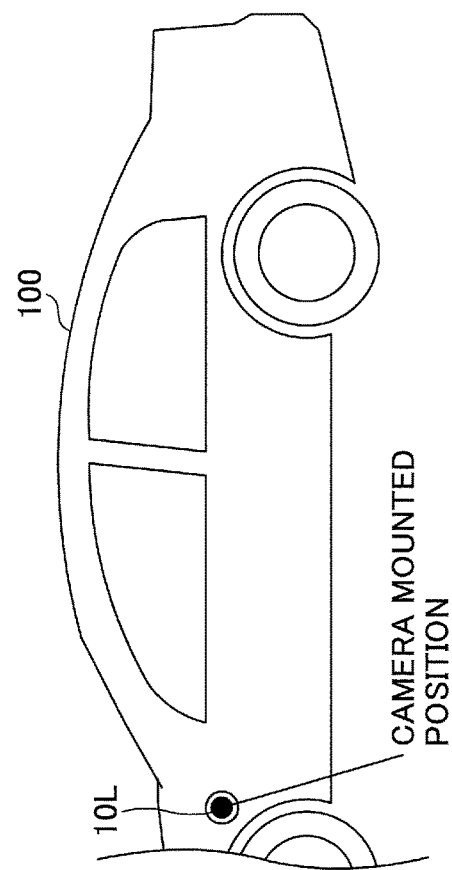

FIGS. 2A and 2B illustrate examples of mounted positions of the cameras 10L and 10R in the vehicle 100. FIG. 2A illustrates a side view viewed from the left side of the vehicle 100, and FIG. 2B illustrates a rear view of a right half of the vehicle 100 viewed from the rear side of the vehicle 100. Thus, the terms "left" and "right" are used as directions viewed from the driver who sits on the driver's seat in the vehicle.

As shown in FIG. 2A, the camera 10L is mounted at, for example, a left fender part of the vehicle 100. In the same way, the camera 10R is mounted at, for example, a right fender part of the vehicle 100.

As shown in FIG. 2B, the camera 10R is mounted in such a manner that, when the vehicle 100 is viewed from a rear side, the objective lens thereof can be seen. That is, the camera 10R is configured to take an image in a predetermined (fixed) imaging range on a horizontal plane extending from a rear side of the vehicle 100 through a right side of the vehicle 100 (along a right side surface of the vehicle). Also, the camera 10R is configured to take an image in a predetermined (fixed) imaging range on a vertical plane extending from a position near a road surface adjacent to the rear right wheel of the vehicle 100 through such an angular direction as to be able to take the whole image of an obstacle (another vehicle, a pedestrian, or so) present in a rear direction of the vehicle 100.

In the same way, the camera 10L is configured to take an image in a predetermined (fixed) imaging range on a horizontal plane extending from a rear side of the vehicle 100 through a left side of the vehicle 100 (along a left side surface of the vehicle). Also, the camera 10L is configured to take an image in a predetermined (fixed) imaging range on a vertical plane extending from a position near a road surface adjacent to the rear left wheel of the vehicle 100 through such an angular direction as to be able to take the whole image of an obstacle (another vehicle, a pedestrian, or so) present in a rear direction of the vehicle 100.

Returning to FIG. 1, the cameras 10L and 10R include imaging parts 11 (i.e., 11L and 11R), and processing parts 12 (i.e., 12L and 12R), respectively.

The imaging parts 11L and 11R correspond to the cameras 10L and 10R, respectively. In the same way, the processing parts 12L and 12R correspond to the cameras 10L and 10R, respectively.

Each of the imaging parts 11L and 11R includes an imaging device, for example, A Complementary Metal-Oxide Semiconductor (CMOS), A Charge Coupled Device (CCD), or so. At every predetermined interval (for example, every 1/30 seconds) during a period of time from an ignition of the vehicle 100 being turned on (IG-ON) to the ignition being turned off (IG-OFF), the imaging parts 11L and 11R take images of the left rear-and-side directions and the right rear-and-side directions of the vehicle 100, and transmit signals corresponding to the taken images (i.e., taken image signals) to the processing parts 12L and 12R, respectively.

Note that, as will be described later, there is a case where the display devices 20L and 20R display partial areas of the taken images of the rear-and-side directions of the vehicle 100 taken by the imaging parts 11L and 11R after magnifying them so as to make them correspond to the sizes of the display screens of the display devices 20L and 20R, respectively. Therefore, it is preferable that the imaging device of each of the imaging parts 11L and 11R has the relatively greater number of pixels.

Each of the processing parts 12L and 12R is an image processing part generating an image (i.e., a displayed image) to be displayed on the corresponding one of the display devices 20L and 20R based on the taken image signal transmitted by the corresponding one of the imaging part 11L and 11R. Each of the processing parts 12L and 12R includes, for example, a microcomputer, and it is possible that the processing parts 12L and 12R carry out various processes described later based on various programs stored in ROMs.

The processing part 12L generates the displayed image including the whole area or a partial area of the taken image of the left rear-and-side directions of the vehicle 100 (i.e., the displayed image of the left rear-and-side directions), and transmits a corresponding signal (a displayed image signal) to the display device 20L. In the same way, the processing part 12R generates the displayed image including the whole area or a partial area of the taken image of the right rear-and-side directions of the vehicle 100 (i.e., the displayed image of the right rear-and-side directions), and transmits a corresponding signal (a displayed image signal) to the display device 20R.

The processing parts 12L and 12R carry out processes of changing (switching) the displayed images to be displayed on the display devices 20L and 20R depending on whether the vehicle 100 travels in the forward direction or in the reverse direction. The processes carried out by the processing part 12L and 12R will be described later in detail.

The display devices 20L and 20R are display parts displaying the taken images of the left rear-and-side directions and the right rear-and-side directions of the vehicle 100 taken by the cameras 10L and 10R or images generated as a result of a predetermined process being carried out on the taken images, respectively. The display device 20L corresponds to the camera 10L (the imaging part 11L) and the display device 20R corresponds to the camera 10R (the imaging part 11R). That is, the display device 20L displays the taken image of the left rear-and-side directions of the vehicle 100 taken by the camera 10L (the imaging part 11L) or an image generated as a result of predetermined transform being carried out on the taken image. The display device 20R displays the taken image of the right rear-and-side directions of the vehicle 100 taken by the camera 10R (the imaging part 11R) or an image generated as a result of predetermined transform being carried out on the taken image. Actually, the display device 20L displays a state in the left rear-and-side directions of the vehicle 100 (the displayed image of the left rear-and-side directions) according to the displayed image signal transmitted from the processing part 12L. The display device 20R displays a state in the right rear-and-side directions of the vehicle 100 (the displayed image of the right rear-and-side directions) according to the displayed image signal transmitted from the processing part 12R. The driver of vehicle 100 can check obstacles (other vehicles, pedestrians, or so) in the rear-and-side directions on the left and right sides of the vehicle 100 by viewing the display devices 20L and 20R without using commonly used door mirrors, fender mirrors, or so. Note that the display devices 20L and 20R can be mounted at any positions as long as the driver can easily see them in the vehicle interior.

The shift range sensor 30 is a known shift position detection part detecting the shift range (the shift position) of a gearbox of the vehicle 100. For example, if an automatic gearbox is installed in the vehicle 100, the available shift ranges include a parking range ("P-range") that is a parking position; a reverse range ("R-range") that is a reverse position; a neutral range ("N-range") that is a neutral position; and a drive range ("D-range") that is a traveling (forward traveling) position. The D-range can include, for example, a shift range for fixing in a specific transmission range, or so. The shift range sensor 30 is connected to the cameras 10L and 10R via an on-vehicle LAN or so in such a manner as to be able to communicate with each other, and transmits a signal corresponding to the thus detected shift range (a shift range signal) to the cameras 10L and 10R.

The steering angle sensor 40 is a known steering angle detection part detecting the steering angle and the steering direction in the steering of the vehicle 100. The steering angle sensor 40 is connected to the cameras 10L and 10R via the on-vehicle LAN or so in such a manner as to be able to communicate with each other, and transmits a signal corresponding to the thus detected steering angle and the steering direction (the steering angle signal) to the cameras 10L and 10R.

Note that, below, it will be assumed that, when the steering direction is the left direction, the steering angle θ of the vehicle 100 has a positive value, whereas, when the steering direction is the right direction, the steering angle θ of the vehicle 100 has a negative value.

The vehicle speed sensor 50 is a known vehicle speed detection part detecting the vehicle speed of the vehicle 100. The vehicle speed sensor 50 is connected with the cameras 10L and 10R via the on-vehicle LAN or so in such a manner that they can communicate with each other, and transmits a signal (a vehicle speed signal) corresponding to the thus detected vehicle speed of the vehicle 100 to the cameras 10L and 10R.

Next, the displayed images displayed on the display devices 20L and 20R when the driver causes the vehicle 100 to travel in the forward direction (in a normal case) and when the vehicle 100 travels in the reverse direction will be described.

First, the displayed images displayed on the display devices 20L and 20R when the driver causes the vehicle 100 to travel in the forward direction (in the normal case) will be described.

Note that the "normal case" means a case where, mainly, the vehicle 100 is in a state of traveling in the forward direction. That is, the "normal case" means a case where the shift range is the D-range. It is also possible that the "normal case" also includes a case(s) where the shift range is another range(s) except for the R-range (i.e., the P-range, the N-range, and/or the like). Below, it will be assumed that the normal case can be a case where the shift range is any one other than the R-range.

Figure 3A:
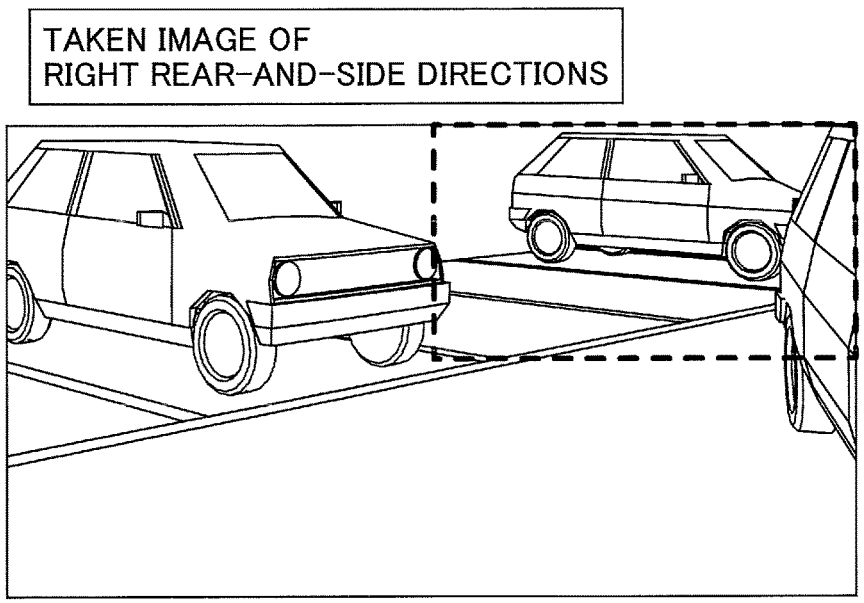
FIGS. 3A and 3B illustrate examples of an image taken by the camera and an image (in a normal case) displayed on a display device.
Figure 3B:
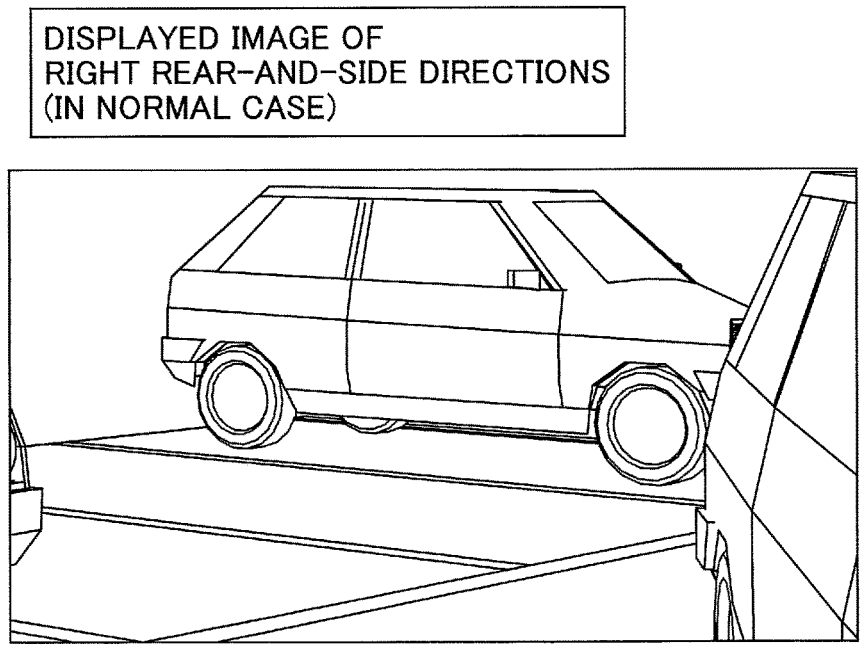

FIGS. 3A and 3B illustrate an image taken by the camera 10R (the imaging part 11R) and an image displayed on the display device 20R (in the normal case), respectively. FIG. 3A illustrates the taken image of the right rear-and-side directions taken by the camera 10R. FIG. 3B illustrates the displayed image of the right rear-and-side directions displayed on the display device 20R in the normal case.

As shown in FIG. 3A, the camera 10R is configured to be able to take an image in the right rear-and-side directions of the vehicle 100 in a wider range than an area in the right rear-and-side directions (the area defined by the broken line) that can be seen by using a commonly used the door mirror or so. The camera 10L is configured also in the same way.

As shown in FIG. 3B, in the normal case, the display device 20R displays, as a "displayed image of the right rear-and-side directions", the area defined by the broken line shown in FIG. 3A that can be seen by using a commonly used door mirror or so included in the taken image of the right rear-and-side directions of the vehicle 100 taken by the camera 10R (the imaging part 11R). That is, the processing part 12R extracts the area corresponding to a commonly used door mirror or so (the first area) from the taken image of the right rear-and-side directions of the vehicle 100 taken by the imaging part 11R, generates the displayed image corresponding to the first area, and transmits it to the display device 20R as the displayed image signal. An image (the displayed image generated by the processing part 12L (the displayed image of the left rear-and-side directions)) displayed by the display device 20L in the normal case is acquired also in the same way.

Thus, in the normal case, the electronic mirror apparatus 1 (the processing parts 12L and 12R) displays, on the display devices 20L and 20R, areas (the first areas) each corresponding to a commonly used door mirror included in the taken images of wide ranges taken by the imaging parts 11L and 11R, respectively. This is because, in the normal case, it is sufficient for the driver to view the areas each corresponding to a commonly used door mirror. Also, it is possible to avoid the driver's concentration from becoming loose due to a state in the rear-and-side directions being displayed in a wide range in the normal case.

Note that, hereinafter, the displayed images displayed on the display devices 20L and 20R in the normal case (i.e., displayed by the processing parts 12L and 12R onto the display devices 20L and 20R) will be referred to as "normal-case displayed images".

Next, the displayed images displayed on the display device 20L and 20R when the driver causes the vehicle 100 to travel in the reverse direction will be described.

Figure 4A:
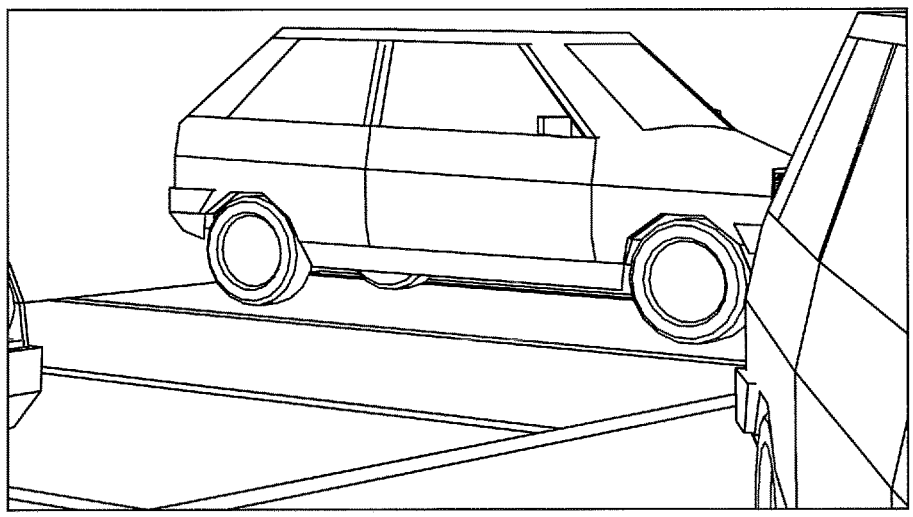
FIGS. 4A and 4B illustrate examples of images (displayed images in right rear-and-side directions) displayed on a display device at a time of vehicle reverse (backward) traveling by an electronic mirror apparatus (a processing part) according to a first embodiment.
Figure 4B:
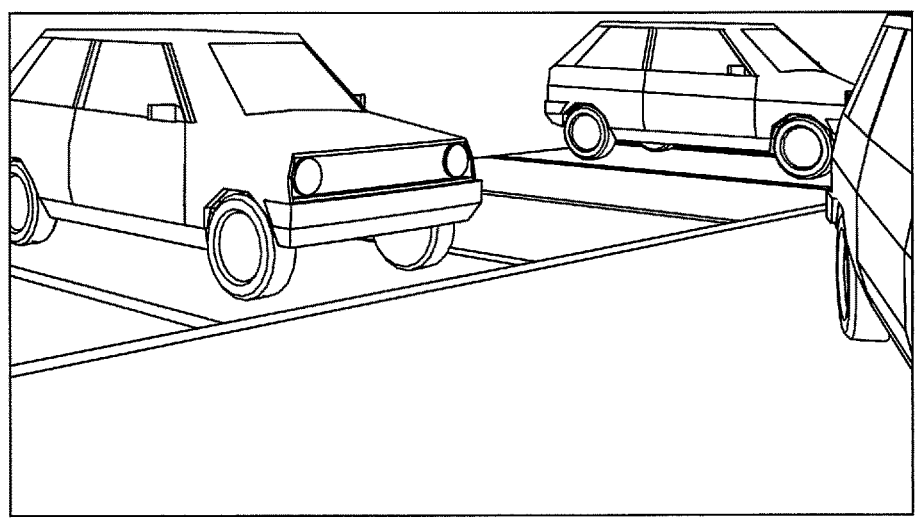

FIGS. 4A and 4B illustrate examples of images (the displayed images of the right rear-and-side directions) displayed on the display device 20R when the driver causes the vehicle 100 to travel in the reverse direction. FIG. 4A illustrates the displayed image of the right rear-and-side directions (the normal-case displayed image) displayed on the display device 20R in a state (i.e., in a state where the shift range is the D-range) before the driver causes the vehicle 100 to travel in the reverse direction. FIG. 4B illustrates the displayed image of the right rear-and-side directions displayed on the display device 20R when the driver causes the vehicle 100 to travel in the reverse direction.

Note that FIGS. 4A and 4B illustrate the displayed images of the right rear-and-side directions displayed on the display device 20R. However, such an operation of switching the displayed image as switching between FIGS. 4A and 4B is carried out in the same way also concerning the displayed image of the left rear-and-side directions displayed on the display device 20L. Below, a description will be made in a manner of focusing on operations of the camera 10R (the imaging part 11R and the processing part 12R) and the display device 20R corresponding to the displayed image of the right rear-and-side directions.

As shown in FIG. 4A, the normal-case displayed image corresponding to a commonly used door mirror is displayed on the display device 20R as described above in a state before the driver causes the vehicle 100 to travel in the reverse direction, i.e., in a state where the shift range is the D-range. That is, the processing part 12R displays, on the display device 20R, an area (the first area) corresponding to an imaging range of a commonly used door mirror or so included in the taken image of the right rear-and-side directions of the vehicle 100 taken by the imaging part 11R.

On the other hand, as shown in FIG. 4B, in the state where the driver causes the vehicle 100 to travel in the reverse direction, an image corresponding to an imaging range different from a case where the shift range is the D-range is displayed. Actually, the taken image corresponding to an imaging range of a wider angle of view than a case where the shift range is the D-range, i.e., the taken image (a "wide-range displayed image") showing the state in the right rear-and-side directions of the vehicle 100 in a wide range is displayed on the display device 20R. The processing part 12R displays the entirety of the taken image of the right rear-and-side directions of the vehicle 100 taken by the imaging part 11R on the display device 20R as the displayed image of the right rear-and-side directions.

Thus, when the driver causes the vehicle 100 to travel in the reverse direction, the wide-range displayed images showing the rear-and-side directions of the vehicle 100 in wider ranges are displayed on the display devices 20L and 20R, respectively, thereby the convenience being improved for the driver.

In fact, when the driver causes the vehicle 100 to travel in the forward direction, the driver performs a driving operation while supplementarily using the states in the rear-and-side directions of the vehicle 100 displayed by the electronic mirror apparatus 1 (the display devices 20L and 20R) (checking necessary points) in many cases. On the other hand, when the driver drives the vehicle 100 to travel in the reverse direction, the driver needs to positively understand the situation in the traveling direction, i.e., the rear-and-side directions of the vehicle 100 from the states in the rear-and-side directions of the vehicle 100 displayed by the electronic mirror apparatus 1 (the display devices 20L and 20R). According to the first embodiment, when the driver causes the vehicle 100 to travel in the reverse direction, the wide-range displayed images are thus displayed on the display devices 20L and 20R. Therefore, the driver can easily and positively understand the situation such as an obstacle or so in the rear-and-side directions of the vehicle 100, and thus, the convenience of the driver can be improved.

Note that, according to the first embodiment, as the wide-range displayed image, the entirety of the taken image of the right rear-and-side directions of the vehicle 100 taken by the imaging part 11R is displayed on the display device 20R. However, it is also possible that even a partial area of the taken image is displayed as long as the situation in the right rear-and-side directions of the vehicle 100 is displayed in a wider range. That is, the processing part 12R displays a second area that is set to be wider than the first area corresponding to the normal-case displayed image included in the taken image taken by the imaging part 11R on the display device 20R as the wide-range displayed image. The processing part 12L displays an image on the display device 20L in the same way.

Next, a process carried out by the electronic mirror apparatus 1 (the processing parts 12L and 12R) according to the first embodiment, i.e., a process of displaying, on each of the display devices 20L and 20R, the corresponding wide-range displayed image for a case where the driver causes the vehicle 100 to travel in the reverse direction will be described in detail.

It is possible that the processing parts 12L and 12R determine that the driver causes the vehicle 100 to travel in the reverse direction when, for example, the shift range (in the gearbox) of the vehicle 100 based on the shift range signal received from the shift range sensor 30 is the R-range, and display the respective wide-range displayed images on the display devices 20L and 20R, respectively.

It is also possible that, as will be described later in another embodiment, satisfaction of another condition is included to display the respective wide-range displayed images on the display devices 20L and 20R, respectively, in addition to the above-mentioned condition that the shift range is the R-range.

Figure 5:
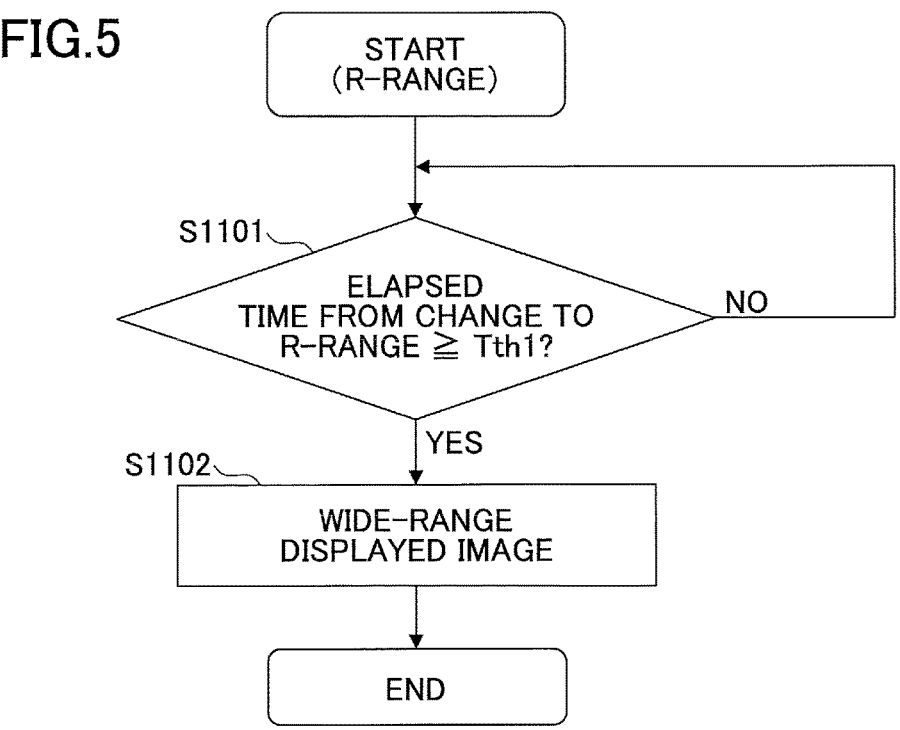
FIG. 5 is a flowchart conceptually illustrating one example of a process carried out by the electronic mirror apparatus (the processing part) according to the first embodiment.

FIG. 5 is a flowchart conceptually illustrating one example of a process carried out by the electronic mirror apparatus 1 (the processing parts 12L and 12R) according to the first embodiment, i.e., a process of displaying the wide-range displayed images.

Note that the process of the flowchart is carried out when the shift range is changed into the R-range during a period from the ignition of the vehicle 100 being turned on (IG-ON) through the ignition being turned off (IG-OFF). If the shift range is changed into a range other than the R-range during the process of the flowchart being carried out, the processing parts 12L and 12R terminate the processes of the flowchart and display the respective normal-case displayed images on the display devices 20L and 20R, respectively.

In step S1101, the processing parts 12L and 12R determine whether the elapsed period of time from the shift range being changed into the R-range is greater than or equal to a predetermined period of time Tth1. If the elapsed period is less than the predetermined period of time Tth1 (NO in step S1101), the processing parts 12L and 12R repeat the determinations. If the elapsed period of time is greater than or equal to the predetermined period of time Tth1, the processing parts 12L and 12R proceed to step S1102.

Note that the predetermined period of time Tth1 is determined appropriately as a period of time greater than a period of time for which, for example, the shift range is expected to be temporarily kept at the R-range in the halfway of shifting the shift range into the P-range from the D-range. It is possible that the processing parts 12L and 12R know, based on the shift range signal received from the shift range sensor 30, that the shift range has been changed into the R-range, start counting operations of internal timers at the same time, and thus, measure the elapsed period of time from the shift range being changed into the R-range.

In step S1102, the processing parts 12L and 12R display the respective wide-range displayed images on the display devices 20L and 20R, and finish the current processes, respectively.

Thus, the electronic mirror apparatus 1 according to the first embodiment displays the wide-range displayed images when the shift range is the R-range and the elapsed period of time from when the shift range was changed into the R-range is greater than or equal to the predetermined period of time Tth1. Thereby, it is possible to change the displayed image on each of the display devices 20L and 20R into the corresponding wide-range displayed image only in a case where the driver actually causes the vehicle 100 to travel in the reverse direction. In fact, if the displayed images on the display devices 20L and 20R were changed into the wide-range displayed images under the condition where the shift range is temporarily kept at the R-range instantaneously in the halfway of shifting the shift range into the P-range from the D-range as mentioned above, the driver may be bothered. Thus, the electronic mirror apparatus 1 according to the first embodiment can avoid such a bothering situation.

Figure 6:
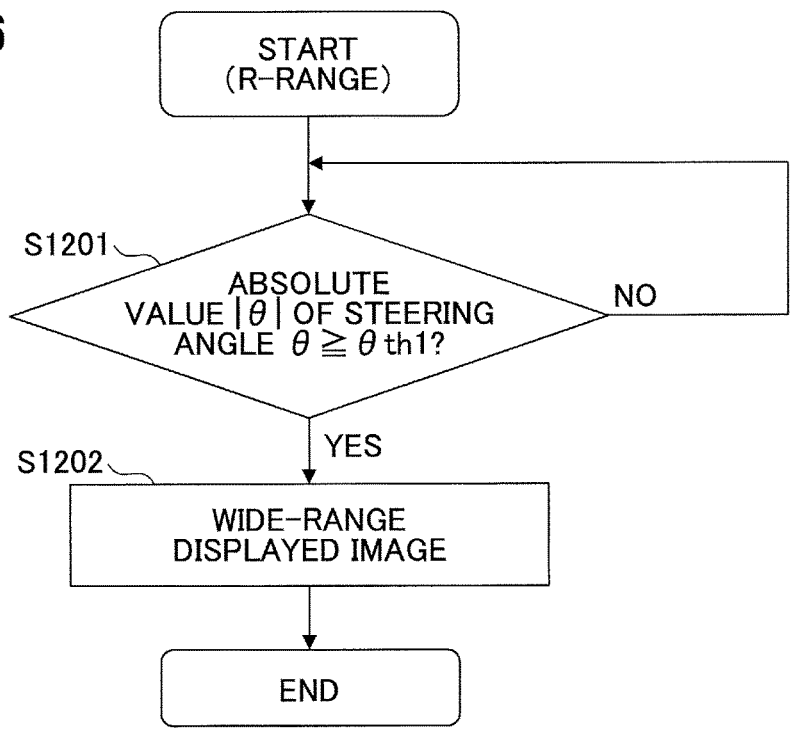
FIG. 6 is a flowchart conceptually illustrating another example of a process carried out by the electronic mirror apparatus (the processing part) according to the first embodiment.

FIG. 6 is a flowchart conceptually illustrating another example of a process carried out by the electronic mirror apparatus 1 (the processing parts 12L and 12R) according to the first embodiment.

Note that in the same way as the example shown in FIG. 5, the process of the flowchart is carried out when the shift range is changed into the R-range during a period of time from IG-ON through IG-OFF of the vehicle 100. Also, in the same way as the example shown in FIG. 5, when the shift range is changed into a range other than the R-range during the process of the flowchart being carried out, the processing parts 12L and 12R terminate the processes of the flowchart, and display the respective normal-case displayed images on the display devices 20L and 20R, respectively.

In step S1201, the processing parts 12L and 12R determine whether the absolute value of the steering angle θ of the vehicle 100 is greater than or equal to a predetermined threshold θth1 (>0). If the absolute value of the steering angle θ of the vehicle 100 is less than the predetermined threshold θth1 (NO in step S1201), the processing parts 12L and 12R repeat the determinations. If the absolute value of the steering angle θ of the vehicle 100 is greater than or equal to the predetermined threshold θth1, the processing parts 12L and 12R proceed to step S1202.

Note that the predetermined threshold θth1 is appropriately determined to be a value corresponding to such a relatively small amount of a steering angle that, for example, it is possible to determine that the driver starts a steering operation.

In step S1202, the processing parts 12L and 12R display the respective wide-range displayed images on the display devices 20L and 20R, and finish the current processes, respectively.

Thus, the electronic mirror apparatus 1 according to the first embodiment displays the wide-range displayed images when the shift range is the R-range and the absolute value of the steering angle θ of the vehicle 100 is greater than or equal to the predetermined threshold θth1. Thereby, it is possible to change the displayed image on each of the display devices 20L and 20R into the corresponding wide-range displayed image only in a case where the driver causes the vehicle 100 to travel in the reverse direction while performing a steering operation, for example, in a case where the driver causes the vehicle 100 to travel in the reverse direction to park the vehicle 100 in a parking space, or so.

Figure 7:
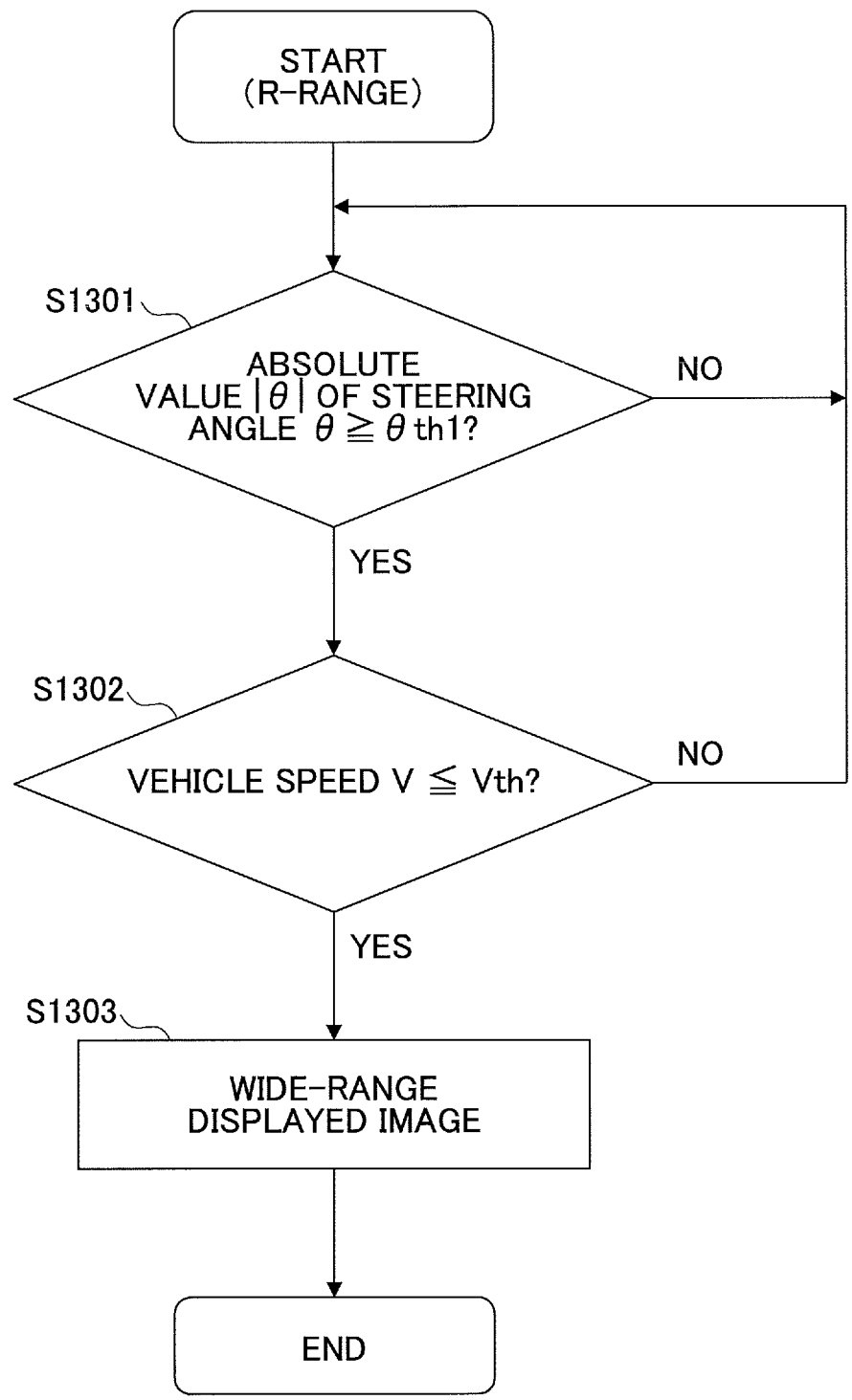
FIG. 7 is a flowchart conceptually illustrating yet another example of a process carried out by the electronic mirror apparatus (the processing part) according to the first embodiment.

FIG. 7 is a flowchart conceptually illustrating yet another example of a process carried out by the electronic mirror apparatus 1 (the processing parts 12L and 12R) according to the first embodiment.

Note that, in the same way as the examples shown in FIGS. 5 and 6, the process of the flowchart is carried out when the shift range is changed into the R-range during a period of time from IG-ON through IG-OFF of the vehicle 100. Also, in the same way as the examples shown in FIGS. 5 and 6, when the shift range is changed into a range other than the R-range during the process of the flowchart being carried out, the processing parts 12L and 12R terminate the processes of the flowchart, and display the respective normal-case displayed images on the display devices 20L and 20R, respectively.

In step S1301, in the same way as step S1201, the processing parts 12L and 12R determine whether the absolute value of the steering angle θ of the vehicle 100 is greater than or equal to the predetermined threshold θth1. If the absolute value of the steering angle θ of the vehicle 100 is less than the predetermined threshold θth1 (NO in step S1301), the processing parts 12L and 12R repeat the determinations. If the absolute value of the steering angle θ of the vehicle 100 is greater than or equal to the predetermined threshold θth1, the processing parts 12L and 12R proceed to step S1302.

In step S1302, the processing parts 12L and 12R determine whether the vehicle speed V of the vehicle 100 based on the vehicle speed signal received from the vehicle speed sensor 50 is less than or equal to a predetermined speed Vth (>0). If the vehicle speed V of the vehicle 100 is greater than the predetermined speed Vth (NO in step S1302), the processing parts 12L and 12R return to step S1301, and repeat the determinations of step S1301. If the vehicle speed V of the vehicle 100 is less than or equal to the predetermined speed Vth in step S1302, the processing parts 12L and 12R proceed to step S1303.

Note that the predetermined speed Vth is appropriately determined as such a value that, for example, it is possible to determine that the vehicle 100 is traveling in the reverse direction at a relatively low speed.

In step S1303, the processing parts 12L and 12R display the respective wide-range displayed images on the display devices 20L and 20R, and finish the current processes, respectively.

Thus, the electronic mirror apparatus 1 according to the first embodiment displays the wide-range displayed images when the shift range is the R-range, the absolute value of the steering angle θ is greater than or equal to the predetermined threshold θth1, and the vehicle speed V is less than or equal to the predetermined speed Vth. Thus, it is possible to avoid a troublesome or wrongness feeling that the driver otherwise has due to switching of the displayed image on each of the display devices 20L and 20R into the corresponding wide-range displayed image when, for example, the driver causes the vehicle 100 to travel in the reverse direction at a relatively high vehicle speed. That is, if the displayed image on each of the display devices 20L and 20R were switched when the vehicle travels at a relatively high vehicle speed, the driver might have a troublesome or wrongness feeling. Therefore, when the driver causes the vehicle 100 to travel in the reverse direction at a relatively high vehicle speed, it is possible to avoid a troublesome or wrongness feeling that the driver otherwise has by preventing the displayed image on each of the display devices 20L and 20R from switching into the wide-range displayed image.

Note that, according to the first embodiment, a process of determining whether a condition concerning the vehicle speed V is satisfied (step S1302) is added based on the embodiment of FIG. 6. However, it is also possible to add a process of determining whether a condition concerning the vehicle speed V is satisfied (corresponding to step S1302) based on the embodiment of FIG. 5. That is, it is possible that the electronic mirror apparatus 1 according to the first embodiment displays the wide-range displayed image when the shift range is the R-range, the duration of the R-range is greater than or equal to the predetermined period of time Tth1, and the vehicle speed V is less than or equal to the predetermined speed Vth. Also in this case, it is possible to acquire the same functions and advantageous effects.

[Second Embodiment]

Next, a second embodiment will be described.

The electronic mirror apparatus 1 according to the second embodiment is different from the first embodiment in that, when the driver causes the vehicle 100 to travel in the reverse direction, an image in an imaging direction different from that of the vehicle 100 traveling in the forward direction is displayed on each of the display devices 20L and 20R. Below, the same reference numerals are given to the same elements as those of the first embodiment, and a description will be made focusing on the different points.

Note that the configuration of the electronic mirror apparatus 1 according to the second embodiment is shown in FIGS. 1, 2A and 2B in the same manner as the first embodiment as, and thus, the duplicate description will be omitted.

First, the displayed image displayed on each of the display devices 20L and 20R when the driver causes the vehicle 100 to travel in the reverse direction will be described.

Figure 8A:
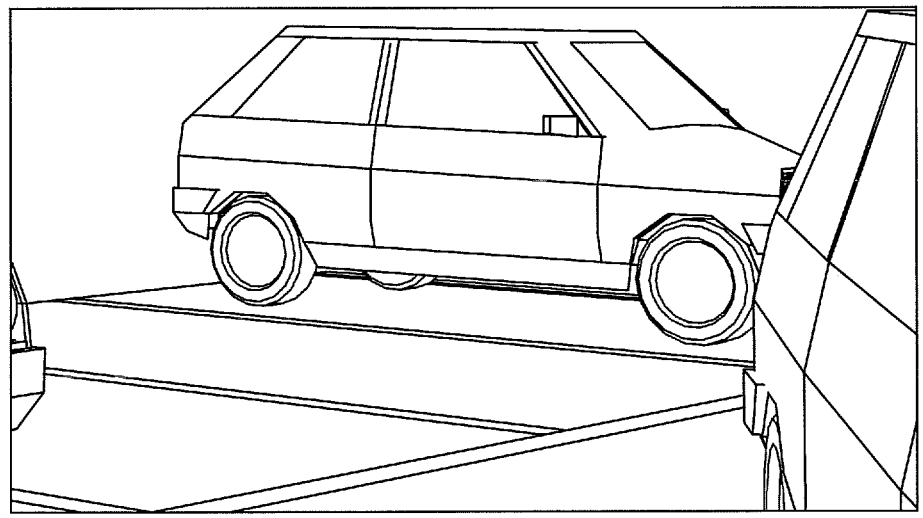
FIGS. 8A and 8B illustrate examples of images (displayed images in the right rear-and-side directions) displayed on a display device at a time of vehicle reverse traveling by an electronic mirror apparatus (a processing part) according to a second embodiment.
Figure 8B:
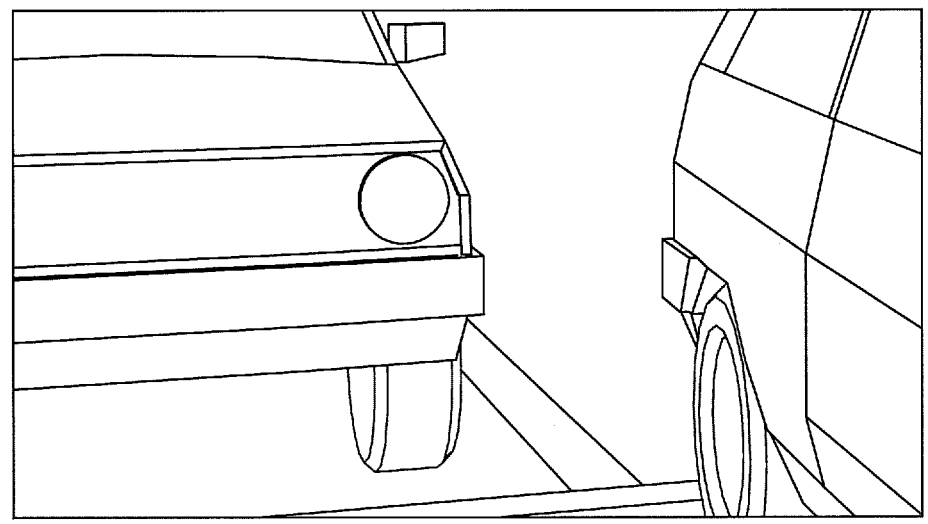

FIGS. 8A and 8B illustrate images (the displayed images of the right rear-and-side directions) displayed on the display device 20R when the driver causes the vehicle 100 to travel in the reverse direction. FIG. 8A shows the displayed image of the right rear-and-side directions (the normal-case displayed image) displayed on the display device 20R (under the condition where the shift range is the D-range) before the driver causes the vehicle 100 to travel in the reverse direction. FIG. 8B shows the displayed image of the right rear-and-side directions displayed on the display device 20R when the driver causes the vehicle 100 to travel in the reverse direction.

Note that FIG. 8A shows the same contents as FIG. 4A, and thus, the duplicate description will be omitted. In FIGS. 8A and 8B, the displayed images of the right rear-and-side directions displayed on the display device 20R are illustrated. However, switching in the displayed image is carried out in the same way also concerning the displayed image of the left rear-and-side directions displayed on the display device 20L. Below, a description will be made focusing on operations of the camera 10R (the imaging part 11R and the processing part 12R) and the display device 20R corresponding to the displayed image of the right rear-and-side directions.

As shown in FIG. 8B, in a state where the driver causes the vehicle 100 to travel in the reverse direction, in the same way as the first embodiment, the taken image corresponding to an imaging range different from one displayed when the shift range is the D-range is displayed. Actually, an image corresponding to an imaging range in an imaging direction different from an imaging direction when the shift range is the D-range is displayed on the display device 20R. That is, an image including an image of a rear wheel of the vehicle 100 and an image of a road surface adjacent to the rear wheel (a "near-rear-wheel displayed image") is displayed on the display device 20R in a state where the driver causes the vehicle 100 to travel in the reverse direction. The processing part 12R displays, on the display device 20R, an area including a rear wheel of the vehicle 100 and a road surface adjacent to the rear wheel (a third area) included in the taken image of the right rear-and-side directions of the vehicle 100 taken by the imaging part 11R as the displayed image of the right rear-and-side directions.

Note that the third area can be set to have a size equivalent to an area corresponding to a commonly used door mirror or so (i.e., a size equivalent to the above-described first area), or can be set to be an area narrower than this.

Thus, by displaying an image including an image of the corresponding rear wheel of the vehicle 100 and an image of a road surface adjacent to the rear wheel (the near-rear-wheel displayed image) on each of the display devices 20L and 20R when the driver causes the vehicle 100 to travel in the reverse direction, it is possible to improve the convenience of the driver.

In fact, for example, in a case where the driver causes the vehicle 100 to travel in the reverse direction while performing a steering operation, in a case where the driver causes the vehicle 100 to travel in the reverse direction for a relatively long distance, or the like, the driver performs driving operations while checking the positional relationship in left and right directions (spaces in left and right directions, or so) with an obstacle present in rear-and-side directions of the vehicle 100, in many cases. Therefore, by displaying the near-rear-wheel displayed image in such a case, it is possible for the driver to easily check the positional relationship in left and right directions with an obstacle present near, and thus, it is possible to improve the convenience of the driver.

Next, a process of the electronic mirror apparatus 1 (the processing parts 12L and 12R) according to the second embodiment, i.e., a process of displaying, on the display devices 20L and 20R, the respective near-rear-wheel displayed images for a case where the driver causes the vehicle 100 to travel in the reverse direction will be described in detail.

FIG. 9 is a flowchart conceptually illustrating one example of a process carried out by the electronic mirror apparatus 1 (the processing parts 12L and 12R) according to the second embodiment, i.e., a process of displaying the near-rear-wheel displayed images.

Note that the process of the flowchart of FIG. 9 is carried out when the shift range is changed into the R-range during a period of time from IG-ON through IG-OFF of the vehicle 100. Also, the processing parts 12L and 12R terminate the processes of this flowchart and display the respective normal-case displayed images on the display devices 20L and 20R, respectively, when the shift range is changed into a range other than the R-range during the process of the flowchart being carried out.

In step S2101, the processing parts 12L and 12R determine whether the absolute value of the steering angle θ based on the steering angle signal received from the steering angle sensor 40 is greater than or equal to a predetermined threshold θth2. If the absolute value of the steering angle θ is less than the predetermined threshold θth2 (NO in step S2101), the processing parts 12L and 12R repeat the determinations. If the absolute value of the steering angle θ is greater than or equal to the predetermined threshold θth2, the processing parts 12L and 12R proceed to step S2102.

Note that the predetermined threshold θth2 is appropriately determined as such a value that it is possible to determine that the driver is performing a relatively great amount of a steering operation. Note that the relationship in magnitude between the predetermined threshold θth2 and the predetermined threshold θth1 in the first embodiment is θth2>θth1 (>0).

In step S2102, the processing parts 12L and 12R display the respective near-rear-wheel displayed images on the display devices 20L and 20R, and finish the current processes, respectively.

Thus, the electronic mirror apparatus 1 according to the second embodiment displays the near-rear-wheel displayed images when the shift range is the R-range and the absolute value of the steering angle θ is greater than or equal to the predetermined threshold θth2. Therefore, when the driver causes the vehicle 100 to travel in the reverse direction while performing a steering operation, the display devices 20L and 20R display the respective near-rear-wheel displayed images, and thus, as described above, it is possible to improve the convenience of the driver.

FIG. 10 is a flowchart conceptually illustrating another example of a process carried out by the electronic mirror apparatus 1 (the processing parts 12L and 12R) according to the second embodiment, i.e., a process of displaying the near-rear-wheel displayed images.

Note that, in the same way as the example shown in FIG. 9, the process of this flowchart is carried out when the shift range is changed into the R-range during a period of time from IG-ON through IG-OFF of the vehicle 100. Also, in the same way as the example shown in FIG. 9, when the shift range is changed into a range other than the R-range during the process of the flowchart being carried out, the processing parts 12L and 12R terminate the processes of the flowchart and display the respective normal-case displayed images on the display devices 20L and 20R, respectively.

In step S2201, the processing parts 12L and 12R determine whether the moving distance L of the vehicle 100 from the change into the R-range is greater than or equal to a predetermined distance Lth1 (>0). If the moving distance L is less than the predetermined distance Lth1 (NO in step S2201), the processing parts 12L and 12R repeat the determinations. If the moving distance L is greater than or equal to the predetermined distance Lth1, the processing parts 12L and 12R proceed to step S2202.

Note that it is possible that each of the processing parts 12L and 12R measures a time by using an internal timer, for example, from when the shift range is changed into the R-range, and calculates the moving distance L by using the vehicle speed signal received from the vehicle speed sensor 50 and the thus measured time. Also, the predetermined distance Lth1 can be appropriately set to be such a value that it can be determined that the vehicle 100 has been traveling in the reverse direction for a relatively long distance.

In step S2202, the processing parts 12L and 12R display the respective near-rear-wheel displayed images on the display devices 20L and 20R, and finish the current processes, respectively.

Thus, the electronic mirror apparatus 1 according to the second embodiment displays the near-rear-wheel displayed images when the shift range is the R-range and the moving distance L at the R-range is greater than or equal to the predetermined distance Lth1. Thereby, when the driver causes the vehicle 100 to travel in the reverse direction for a relatively long distance, the display device 20L and 20R display the respective near-rear-wheel displayed images, as described above. Thus, it is possible to improve the convenience of the driver.

Note that, it is also possible to combine the examples shown in FIGS. 9 and 10. That is, it is possible that the electronic mirror apparatus 1 (the processing parts 12L and 12R) displays the respective near-rear-wheel displayed images on the display devices 20L and 20R if either one of the determination condition of step S2101 and the determination condition of step S2201 is satisfied.

[Third Embodiment]

Next, a third embodiment will be described.

The electronic mirror apparatus 1 according to the third embodiment is different from the first and second embodiments in that the displayed image (i.e., a "white-line-bird's-eye-view image", described later) suitable when the driver causes the vehicle 100 to travel in the reverse direction to park it in a parking space that is defined on a road surface by a section line is displayed on each of the display devices 20L and 20R. The same reference signs are given to the same elements as those of the first and second embodiments, and a description will be made focusing on the different points.

Note that the configuration of the electronic mirror apparatus 1 according to the third embodiment is shown in FIGS. 1, 2A and 2B in the same manner as the first and second embodiments, and thus, the duplicate description will be omitted.

First, the displayed image displayed on each of the display devices 20L and 20R when the driver causes the vehicle 100 to travel in the reverse direction will be described.

Figure 11A:
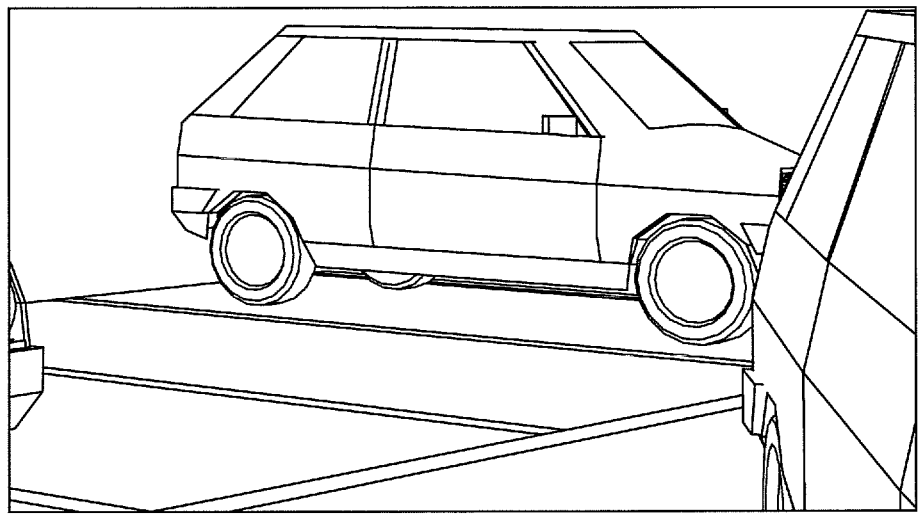
FIGS. 11A and 11B illustrate examples of images (displayed images in the right rear-and-side directions) displayed on a display device at a time of vehicle reverse traveling by an electronic mirror apparatus (a processing part) according to a third embodiment.
Figure 11B:
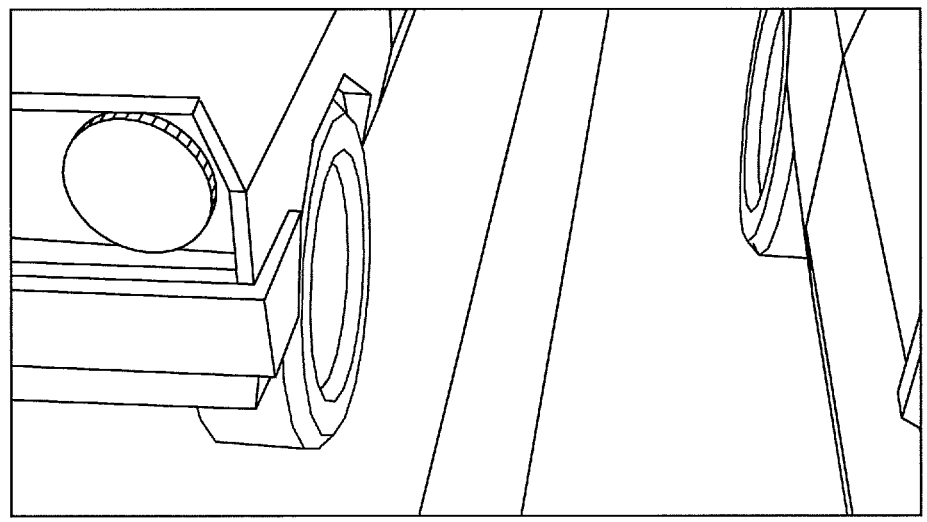

FIGS. 11A and 11B illustrate one example of an image (the displayed image of the right rear-and-side directions) displayed on the display device 20R when the driver causes the vehicle 100 to travel in the reverse direction. FIG. 11A shows the displayed image of the right rear-and-side directions (the normal-case displayed image) displayed on the display device 20R (under the condition where the shift range is the D-range) before the driver causes the vehicle 100 to travel in the reverse direction. FIG. 11B shows one example of the displayed image of the right rear-and-side directions displayed on the display device 20R when the driver causes the vehicle 100 to travel in the reverse direction.

Note that FIG. 11A shows the same contents as those of FIG. 4A. Therefore, the duplicate description will be omitted. FIGS. 11A and 11B illustrate the displayed images of the right rear-and-side directions displayed on the display device 20R. The same switching in the displayed image is carried out also on the displayed image of the left rear-and-side directions displayed on the display device 20L. Below, a description will be made focusing on operations of the camera 10R (the imaging part 11R and the processing part 12R) and the display device 20R corresponding to the displayed image of the right rear-and-side directions.

As shown in FIGS. 11A and 11B, in the state where the driver causes the vehicle 100 to travel in the reverse direction, an image corresponding to an imaging range different from a case where the shift range is the D-range is displayed, in the same way as the first and second embodiments. Actually, an image corresponding to an imaging range in an imaging direction different from an imaging direction in a case where the shift range is the D-range, i.e., a bird's eye view of a road surface including an image of a rear wheel of the vehicle 100 and an image of a road surface adjacent to the rear wheel (a bird's eye view of a white line as a parking section line drawn on a road surface, i.e., the white-line-bird's-eye-view image) is displayed on the display device 20R (see FIG. 11B). The processing part 12R sets an area (a fourth area) including a rear wheel of the vehicle 100 and a road surface adjacent to the rear wheel included in the taken image of the right rear-and-side directions of the vehicle 100 taken by the imaging part 11R. Then, the processing part 12R carries out a known image transform process on the fourth area, generates a bird's-eye-view image of (a white line of) a road surface adjacent to a rear wheel taken obliquely from the top of the vehicle 100 (the white-line-bird's-eye-view image), and displays it on the display device 20R as the displayed image of the right rear-and-side directions. It is possible that the processing part 12R carries out a known viewpoint transform process, for example, on the area (the fourth area) including an image of a rear wheel of the vehicle 100 and an image of a road surface adjacent to the rear wheel, and generates the white-line-bird's-eye-view image. It is also possible that, as a simplified manner, the processing part 12R extracts a trapezoidal area including an image of a rear wheel of the vehicle 100 and an image of a road surface adjacent to the rear wheel from the taken image of the right rear-and-side directions of the vehicle 100 taken by the imaging part 11R, transforms (expands) the extracted area into a rectangular image corresponding to the display device 20R, and thus generates the white-line-bird's-eye-view image.

Thus, when the driver causes the vehicle 100 to travel in the reverse direction, the display devices 20L and 20R display respective bird's-eye view images of road surfaces (the white-line-bird's-eye-view images) including images of the respective rear wheels of the vehicle 100 and images of road surface adjacent to the rear wheels, and thus, it is possible to improve the convenience of the driver.

Actually, when parking the vehicle 100 in a parking space defined by a section line drawn on a road surface, for example, the driver performs an operation (fine adjustment) to finally make the vehicle 100 coincident with the parking space. Therefore, it is necessary to check the positional relationship between the vehicle 100 and the white line (the section line). Therefore, in such a case, by displaying the respective white-line-bird's-eye-view images on the display devices 20L and 20R, it is possible to easily and positively make the vehicle 100 coincident with the parking space. Thus, it is possible to improve the convenience of the driver.

Next, a process of the electronic mirror apparatus 1 (the processing parts 12L and 12R) according to the third embodiment, i.e., a process of displaying, on the display devices 20L and 20R, the respective white-line-bird's-eye-view images for a case where the driver causes the vehicle 100 to travel in the reverse direction will be described in detail.

Figure 12:
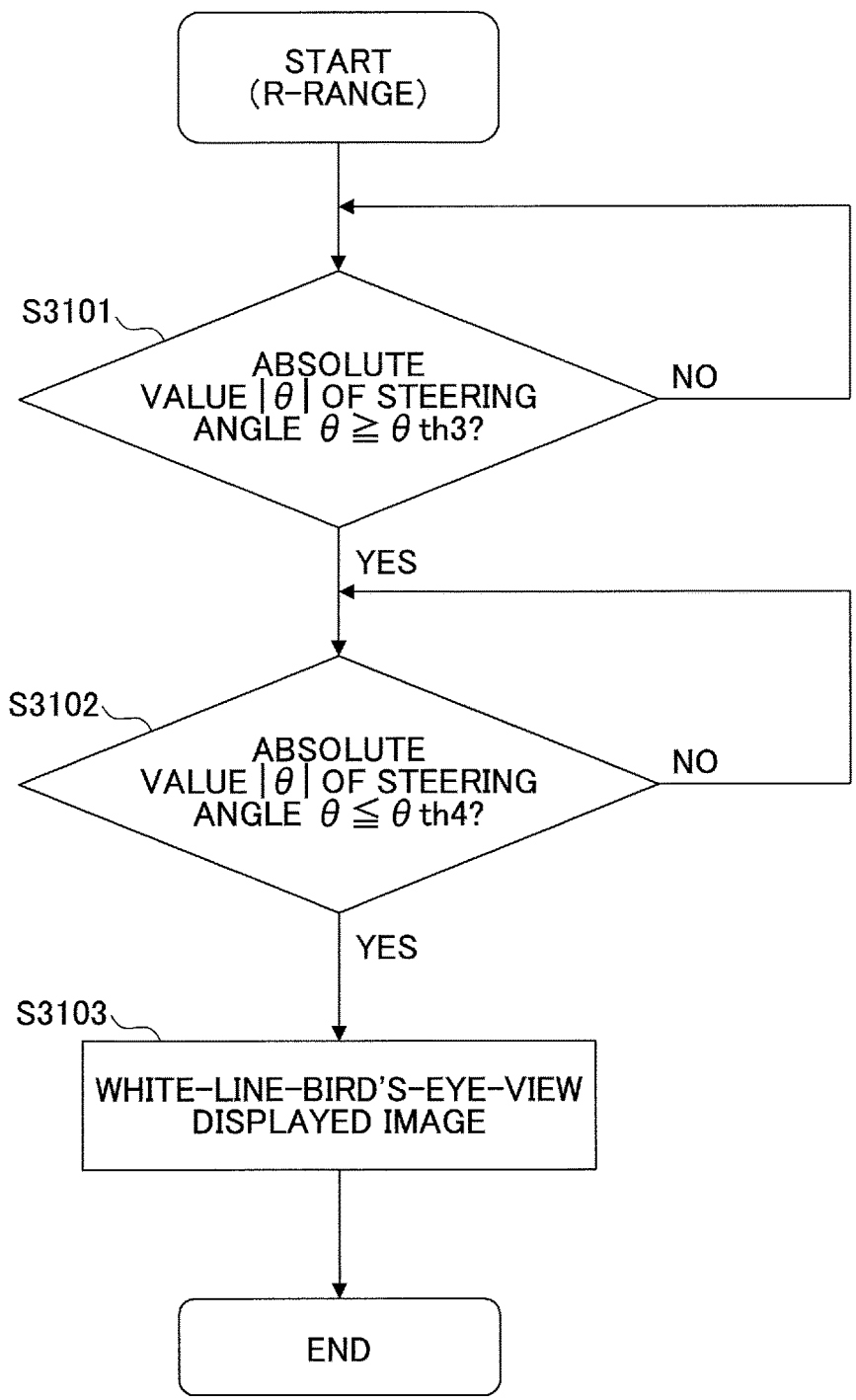
FIG. 12 is a flowchart conceptually illustrating one example of a process carried out by the electronic mirror apparatus (the processing part) according to the third embodiment.

FIG. 12 a flowchart conceptually illustrating a process of the electronic mirror apparatus 1 (the processing parts 12L and 12R) according to the third embodiment, i.e., one example of a process of displaying the white-line-bird's-eye-view images.

Note that the process of the flowchart is carried out when the shift range is changed into the R-range during a period of time from IG-ON through IG-OFF of the vehicle 100. Also, when the shift range is changed into a range other than the R-range during the process of the flowchart being carried out, the processing parts 12L and 12R terminate the processes of the flowchart and display the respective normal-case displayed images on the display devices 20L and 20R, respectively.

In step S3101, the processing parts 12L and 12R determine whether the absolute value of the steering angle $\theta$ based on the steering angle signal received from the steering angle sensor 40 is greater than or equal to a predetermined threshold $\theta th3$. When the absolute value of the steering angle $\theta$ is less than the predetermined threshold $\theta th3$ (NO in step S3101), the processing parts 12L and 12R repeat the determinations. If the absolute value of the steering angle $\theta$ is greater than or equal to the predetermined threshold $\theta th3$, the processing parts 12L and 12R proceed to step S3102.

Note that the predetermined threshold $\theta th3$ is appropriately determined as such a value that it is possible to determine that the driver is performing a relatively great amount of a steering operation. The relationship in magnitude between the predetermined threshold $\theta th3$ and the predetermined threshold $\theta th1$ in the first embodiment is $\theta th3 > \theta th1$ ($>0$). The predetermined threshold $\theta th3$ can have a value equivalent to the predetermined threshold $\theta th2$ in the second embodiment.

In step S3102, the processing parts 12L and 12R determine whether the absolute value of the steering angle $\theta$ based on the steering angle signal received from the steering angle sensor 40 is less than or equal to a predetermined threshold $\theta th4$ ($\geq 0$). If the absolute value of the steering angle $\theta$ is greater than the predetermined threshold $\theta th4$ (NO in step S3102), the processing parts 12L and 12R repeat the determinations. If the absolute value of the steering angle $\theta$ is less than or equal to the predetermined threshold $\theta th4$, the processing parts 12L and 12R proceed to step S3103.

Note that the predetermined threshold $\theta th4$ can be appropriately set as such a value that, in consideration of the detection accuracy of the steering angle sensor 40 and so forth, it is possible to determine that the vehicle 100 returns to travel approximately straight, i.e., the steering angle $\theta$ returns to approximately zero. Also, the relationship in magnitude between the predetermined threshold $\theta th4$ and the predetermined threshold $\theta th3$ is $\theta th3 > \theta th4$ ($\geq 0$).

In step S3103, the processing parts 12L and 12R display the respective white-line-bird's-eye-view images on the display devices 20L and 20R, and finish the current processes, respectively.

Thus, the electronic mirror apparatus 1 according to the third embodiment displays the white-line-bird's-eye-view images, when the absolute value of the steering angle $\theta$ becomes greater than or equal to the predetermined threshold $\theta th3$ and thereafter it becomes less than or equal to the predetermined threshold $\theta th4$, during a continuation of the R-range. Thereby, in a situation where the driver causes the vehicle 100 to travel in the reverse direction with a relatively great amount of a steering operation to park in a parking space, the white-line-bird's-eye-view images are displayed when the driver finally makes the vehicle 100 coincident with the parking space. Therefore, as described above, it is possible to improve the convenience of the driver. That is, by determining that the driver causes the vehicle 100 to travel in the reverse direction with a relatively great amount of a steering angle $\theta$ ($\geq$ the predetermined threshold $\theta th3$), and thereafter, the steering angle $\theta$ returns to approximately zero (the steering angle θ≤the predetermined threshold θth4), it is possible to determine that it is such a situation that the driver makes the vehicle 100 coincident with the parking space. Therefore, by displaying the white-line-bird's-eye-view images in such a situation, the driver can easily and positively make the vehicle 100 coincident with the parking space, and thus, it is possible to improve the convenience of the driver.

Figure 13:
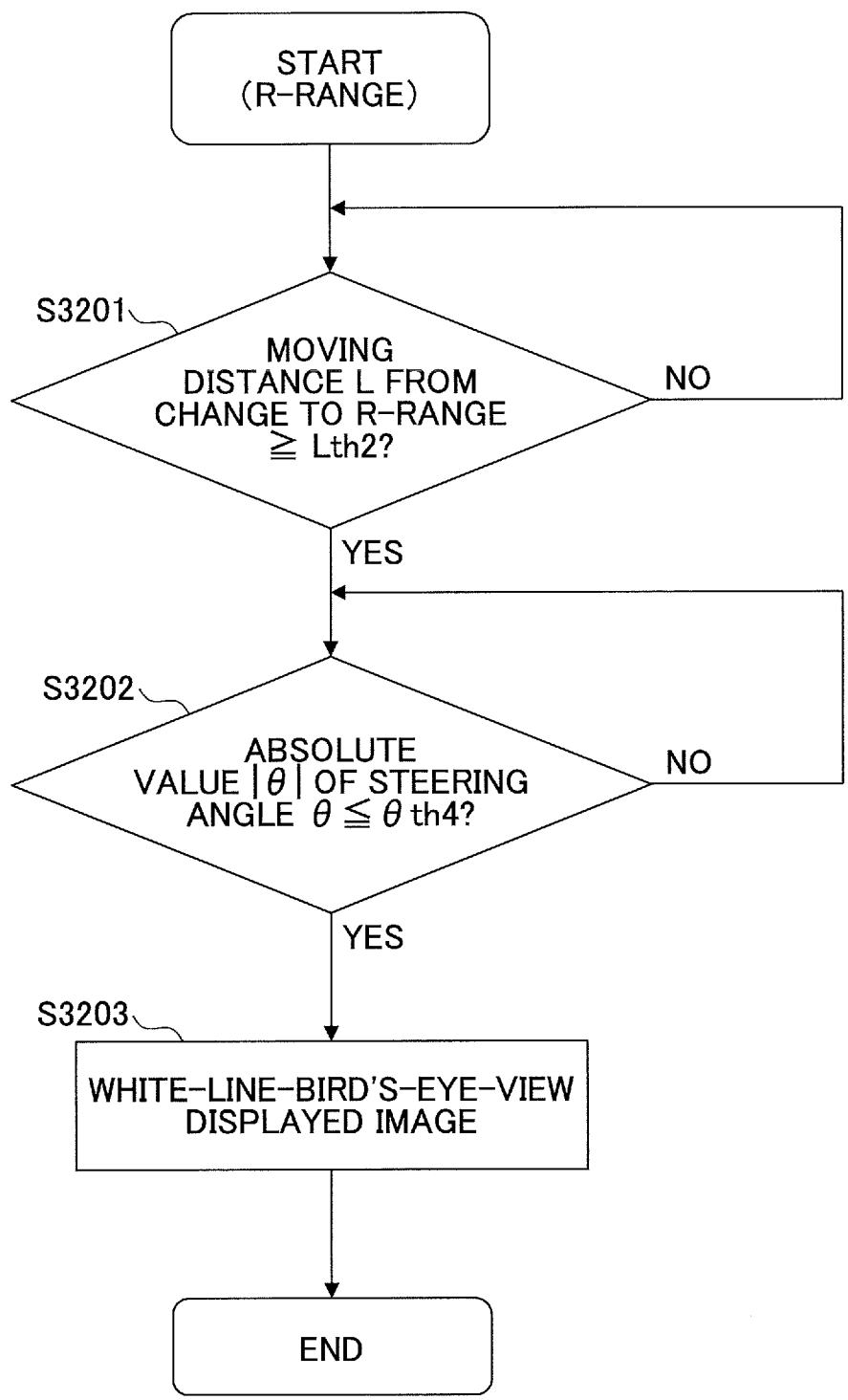
FIG. 13 is a flowchart conceptually illustrating another example of a process carried out by the electronic mirror apparatus (the processing part) according to the third embodiment.

FIG. 13 is a flowchart conceptually illustrating another example of a process carried out by the electronic mirror apparatus (the processing part) according to the third embodiment, i.e., a process of displaying the white-line-bird's-eye-view images.

Note that in the same way as the example shown in FIG. 12, the process of the flowchart is carried out when the shift range is changed into the R-range during a period of time from IG-ON through IG-OFF of the vehicle 100. Also, in the same way as the example shown in FIG. 12, when the shift range is changed into a range other than the R-range during the process of the flowchart being carried out, the processing parts 12L and 12R terminate the processes of the flowchart and display the respective normal-case displayed images on the display devices 20L and 20R, respectively.

In step S3201, the processing parts 12L and 12R determine whether the moving distance L of the vehicle 100 after the shift range has been changed into the R-range is greater than or equal to a predetermined distance Lth2 (>0). If the moving distance L is less than the predetermined distance Lth2 (NO in step S3201), the processing parts 12L and 12R repeat the determinations. If the moving distance L is greater than or equal to the predetermined distance Lth2, the processing parts 12L and 12R proceed to step S3202.

Note that the predetermined distance Lth2 can be appropriately set in such a value that it is possible to determine that the vehicle 100 has been traveling in the reverse direction for a relatively long distance. Also, the predetermined distance Lth2 can be a value equivalent to the predetermined distance Lth1 in the second embodiment.

In step S3202, the processing parts 12L and 12R determine whether the absolute value of the steering angle θ based on the steering angle signal received from the steering angle sensor 40 is less than or equal to the predetermined threshold θth4. If the absolute value of the steering angle θ is greater than the predetermined threshold θth4 (NO in step S3202), the processing parts 12L and 12R repeat the determinations. If the absolute value of the steering angle θ is less than or equal to the predetermined threshold θth4, the processing parts 12L and 12R proceed to step S3203.

In step S3203, the processing parts 12L and 12R display the respective white-line-bird's-eye-view images on the display devices 20L and 20R, and finish the current processes, respectively.

Thus, the electronic mirror apparatus 1 according to the third embodiment displays the white-line-bird's-eye-view images, when the moving distance L of the vehicle 100 at the R-range becomes greater than or equal to the predetermined distance Lth2 and thereafter the absolute value of the steering angle θ becomes less than or equal to the predetermined threshold θth4, during a continuation of the R-range. Thereby, the white-line-bird's-eye-view images are displayed in such a situation that the driver causes the vehicle 100 to travel in the reverse direction to park in a parking space almost without performing a steering operation, and finally the driver makes the vehicle 100 coincident with the parking space. Therefore, as described above, it is possible to improve the convenience of the driver. That is, by determining that the driver causes the vehicle 100 to travel in the reverse direction for a relatively great distance (the moving distance L≥the predetermined threshold Lth2) at the R-range and thereafter the steering angle θ becomes approximately zero (the steering angle θ≤the predetermined threshold θth4), it is possible to determine that it is such a situation that the driver makes the vehicle 100 coincident with the parking space. Therefore, by displaying the white-line-bird's-eye-view images in such a situation, the driver can easily and positively make the vehicle 100 coincident with the parking space, and thus, it is possible to improve the convenience of the driver.

Note that the examples of FIGS. 12 and 13 can be combined. That is, it is possible that the electronic mirror apparatus 1 (the processing parts 12L and 12R) displays the respective white-line-bird's-eye-view images on the display devices 20L and 20R when either one of the determination condition of step S3101 and the determination condition of step S3201 is satisfied and thereafter the condition of step S3102 (the process of step S3202) is satisfied.

[Fourth Embodiment]

Next, a fourth embodiment will be described.

The electronic mirror apparatus 1 according to the fourth embodiment is different from the first, second and third embodiments in that, when the driver causes the vehicle 100 to travel in the reverse direction, the electronic mirror apparatus 1 carries out a sequence of display switching processes of switching the displayed images (i.e., the wide-range displayed images, the near-rear-wheel displayed images and the white-line-bird's-eye-view images) described above for the first, second and third embodiments according to predetermined conditions. Below, the same reference numerals are given to the same elements as those of the first to third embodiments, and description will be made in a manner of focusing on the different points.

Note that the configuration of the electronic mirror apparatus 1 according to the fourth embodiment is shown in FIGS. 1, 2A and 2B in the same manner as the first to third embodiments, and thus, the duplicate description will be omitted.

Figure 14:
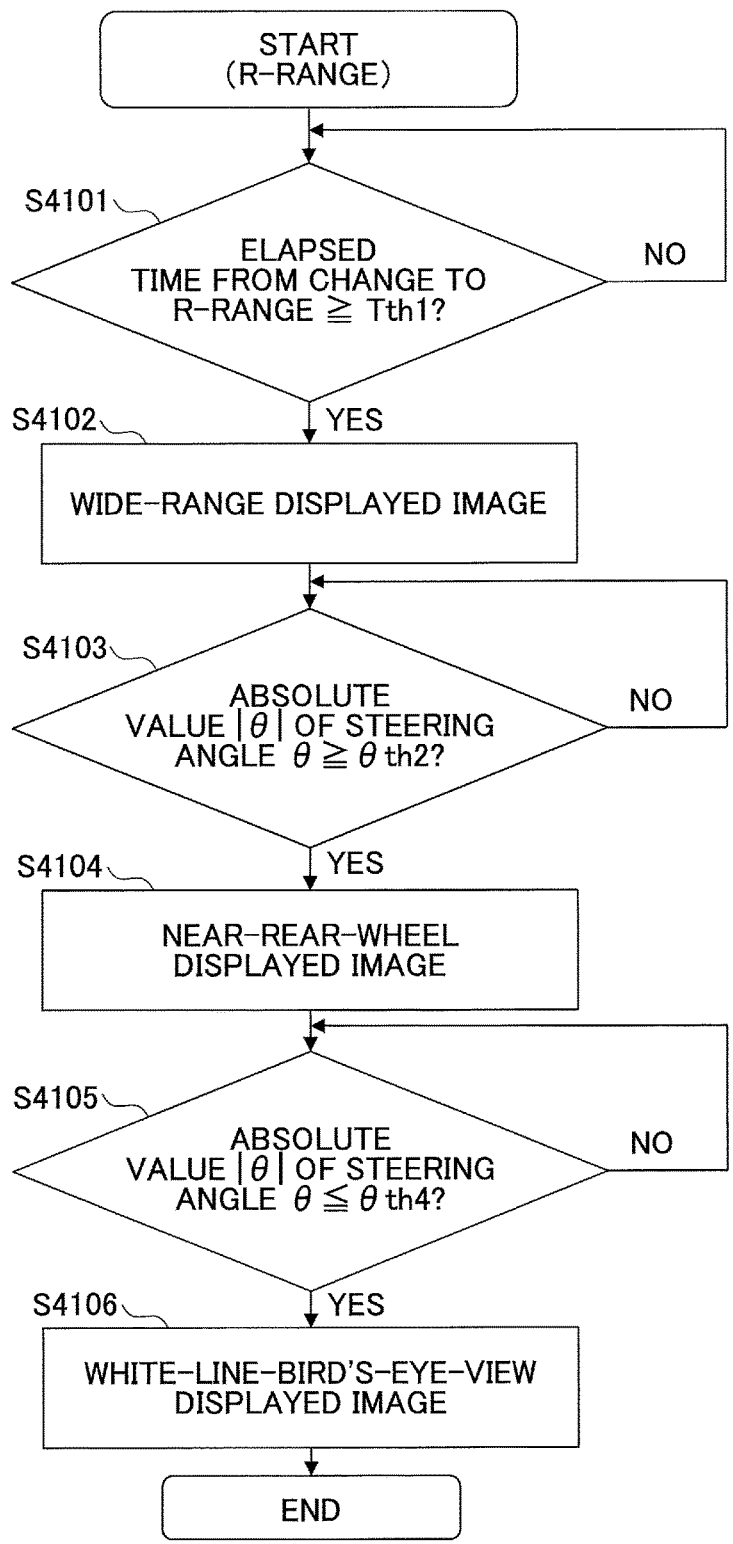
FIG. 14 is a flowchart conceptually illustrating one example of a process carried out by an electronic mirror apparatus (a processing part) according to a fourth embodiment.

FIG. 14 is a flowchart conceptually illustrating one example of a process carried out by the electronic mirror apparatus 1 (the processing parts 12L and 12R) according to the fourth embodiment, i.e., a process of switching the displayed images on the display devices 20L and 20R when the driver causes the vehicle 100 to travel in the reverse direction.

Note that the process of the flowchart is carried out when the shift range is changed into the R-range during a period of time from IG-ON through IG-OFF of the vehicle 100. Also, when the shift range is changed into a range other than the R-range during the process of the flowchart being carried out, the processing parts 12L and 12R terminate the processes of the flowchart and display the respective normal-case displayed images on the display devices 20L and 20R, respectively. Also, it is assumed that the predetermined threshold θth2 in the second embodiment is equivalent to the predetermined threshold θth3 in the third embodiment. Also, it is assumed that the predetermined distance Lth1 in the second embodiment is equivalent to the predetermined distance Lth2 in the third embodiment.

In step S4101, the processing parts 12L and 12R determine whether the elapsed period of time from the shift range being changed into the R-range is greater than or equal to the predetermined period of time Tth1. If the elapsed period of time is less than the predetermined period of time Tth1 (NO in step S4101), the processing parts 12L and 12R repeat the determinations. If the elapsed period of time is greater than or equal to the predetermined period of time Tth1, the processing parts 12L and 12R proceed to step S4102.

Note that, it is also possible that step S4101 is omitted, and thus, when the shift position becomes the R-range, a process of step S4102 described later is carried out. It is also possible that, in step S4101, instead of using the above-mentioned determination condition, it is determined whether the determination condition of step S1201 in the example of FIG. 6 according to the first embodiment is satisfied. It is also possible that, in step S4101, instead of using the above-mentioned determination condition, it is determined whether both of the determination conditions of steps S1301 and S1302 in the example of FIG. 7 according to the first embodiment are satisfied.

In step S4102, the processing parts 12L and 12R display the respective wide-range displayed images on the display devices 20L and 20R.

In step S4103, the processing parts 12L and 12R determine whether the absolute value of the steering angle θ based on the steering angle signal received from the steering angle sensor 40 is greater than or equal to the predetermined threshold θth2. If the absolute value of the steering angle θ is less than the predetermined threshold θth2 (NO in step S4103), the processing parts 12L and 12R repeat the determinations. If the absolute value of the steering angle θ is greater than or equal to the predetermined threshold θth2, the processing parts 12L and 12R proceed to step S4104.

Note that it is also possible that, in step S4103, instead of using the above-mentioned determination condition, it is determined whether the determination condition of step S2201 in the example of FIG. 10 according to the second embodiment is satisfied. It is also possible that, in step S4103, it is determined whether either one of the above-mentioned determination condition and the determination condition of step S2201 in the example of FIG. 10 according to the second embodiment is satisfied. In this case, if none of the determination conditions is satisfied, the processing parts 12L and 12R repeat the determinations. If either one is satisfied, the processing parts 12L and 12R proceed to step S4104.

In step S4104, the processing parts 12L and 12R display the respective near-rear-wheel displayed images on the display devices 20L and 20R.

In step S4105, the processing parts 12L and 12R determine whether the absolute value of the steering angle θ based on the steering angle signal received from the steering angle sensor 40 is less than or equal to the predetermined threshold θth4. If the absolute value of the steering angle θ is greater than the predetermined threshold θth4 (NO in step S4105), the processing parts 12L and 12R repeat the determinations. If the absolute value of the steering angle θ is less than or equal to the predetermined threshold θth4, the processing parts 12L and 12R proceed to step S4106.

In step S4106, the processing parts 12L and 20R display the respective white-line-bird's-eye-view images on the display devices 20L and 20R, and finish the current processes, respectively.

Thus, the electronic mirror apparatus 1 according to the fourth embodiment carries out a process of switching, in sequence, the displayed images on the display devices 20L and 20R when the driver causes the vehicle 100 to travel in the reverse direction according to predetermined conditions, and thus, the first to third embodiments are combined. Thereby, the displayed images are switched depending on a situation such as, for example, a situation where the driver causes the vehicle 100 to travel in the reverse direction to park it in a parking space. Thus, the convenience of the driver is improved.

For example, when the driver causes the vehicle 100 to travel in the reverse direction to park it in a parking space defined by a section line on a road surface, the driver first needs to positively check the entire situation in the rear-and-side directions of the vehicle 100 (as to whether there is any obstacle, the positional relationship with the obstacle, if any, and so forth), and then, starts causing the vehicle 100 to travel in the reverse direction. Therefore, for example, when the duration of the R-range becomes greater than or equal to the predetermined period of time Tth1, the wide-range displayed images are displayed on the display devices 20L and 20R.

Thereafter, the driver needs to cause the vehicle 100 to travel in the reverse direction toward the parking space while checking the positional relationship in left and right directions with another parked vehicle adjacent to the parking space, another obstacle (a wall or so). Therefore, if, for example, the absolute value of the steering angle θ becomes greater than or equal to the predetermined threshold θth2, the display devices 20L and 20R display the respective near-rear-wheel displayed images.

Finally, the driver needs to perform fine adjustment to make the vehicle 100 coincident with the parking space, as described above. Therefore, when the absolute value of the steering angle θ becomes less than or equal to the predetermined threshold θth4, the white-line-bird's-eye-view image are displayed on the display devices 20L and 20R.

Thus, depending on the situation, the displayed images are automatically switched as "wide-range displayed images"→"near-rear-wheel displayed images"→"white-line-bird's-eye-view images". As a result, the driver can easily and positively cause the vehicle 100 to travel in the reverse direction and park it in the parking space.

[Variant]

Next, a variant of the above-described embodiments will be described.

In the above-described respective embodiments, depending on a predetermined condition when the driver causes the vehicle 100 to travel in the reverse direction, both the display devices 20L and 20R change their displayed images. However, it is also possible that, depending on the steering direction (the right direction or the left direction), the displayed image of only one of the display devices 20L and 20R is changed.

Below, description will be made using, for one example, a case where, as described for the first embodiment (the example shown in FIG. 6), the wide-range displayed image is displayed.

Figure 15A:
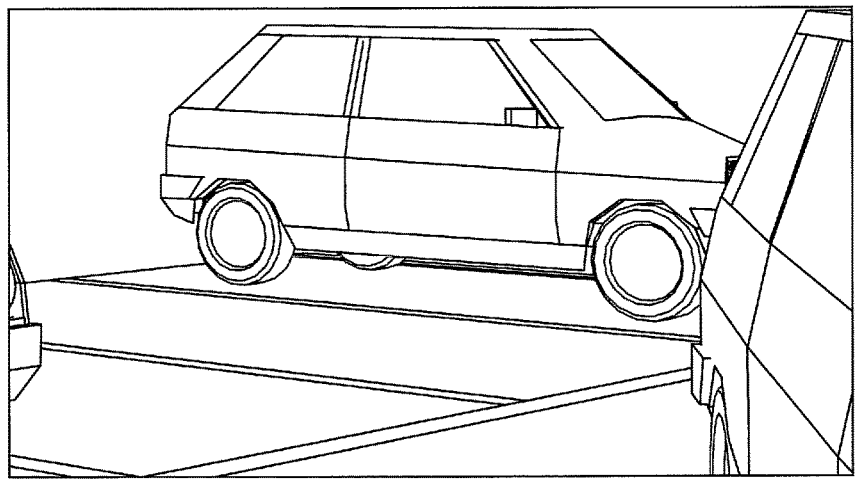
FIGS. 15A and 15B illustrate examples of images (displayed images in the right rear-and-side directions) displayed on a display device at a time of vehicle reverse traveling by an electronic mirror apparatus (a processing part) according to a variant.
Figure 15B:
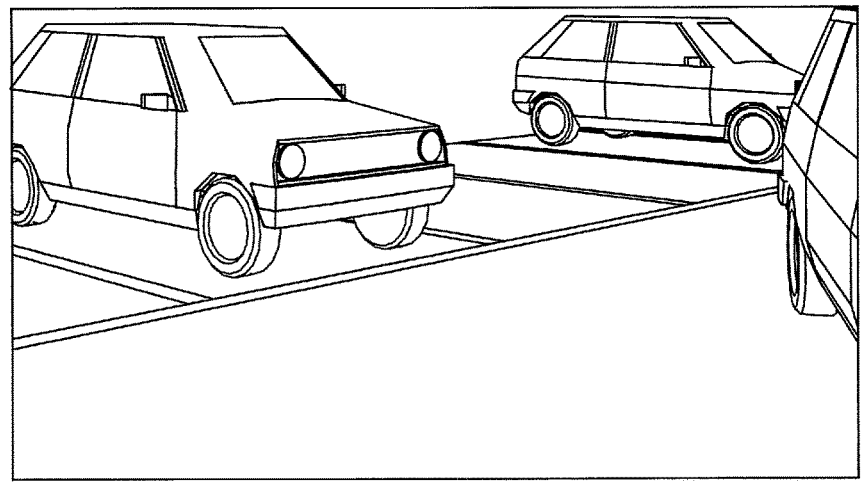
Figure 16A:
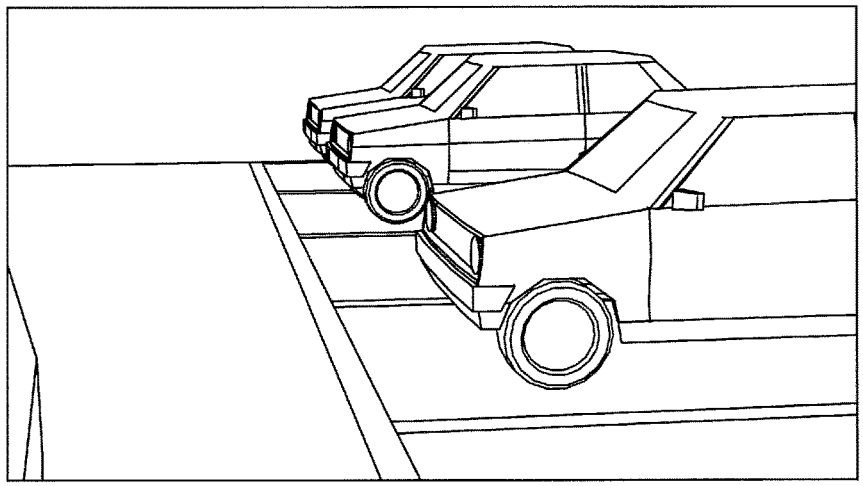
FIGS. 16A and 16B illustrate examples of images (displayed images in a left rear-and-side directions) displayed on a display device at a time of vehicle reverse traveling by the electronic mirror apparatus (the processing part) according to the variant.
Figure 16B:
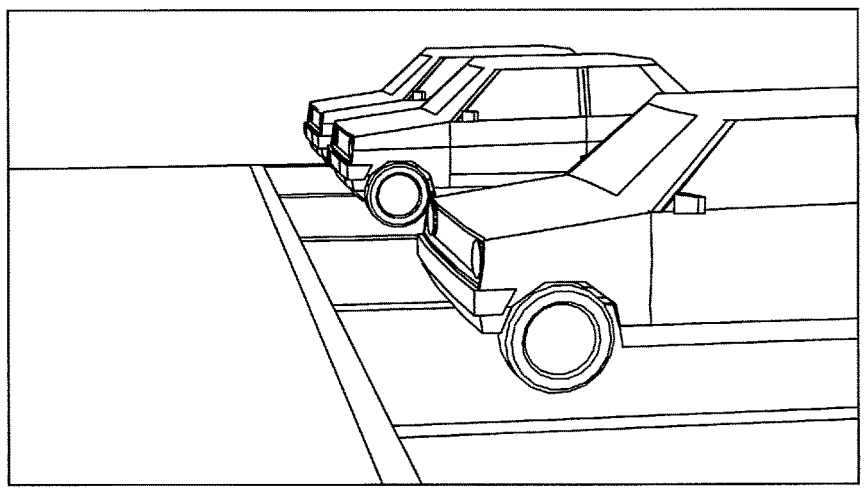

FIGS. 15A and 15B and FIGS. 16A and 16B illustrate examples of the displayed images displayed on the display devices 20L and 20R in the electronic mirror apparatus 1 according to the variant when the driver causes the vehicle 100 to travel in the reverse direction while operating the steering in the right direction. FIGS. 15A and 15B illustrate the displayed images of the right rear-and-side directions displayed on the display device 20R. FIG. 15A illustrates one example of the displayed image of the right rear-and-side directions when the shift range is the D-range. FIG. 15B illustrates one example of the displayed image of the right rear-and-side directions when the shift range is the R-range and the steering is being operated in the right direction. FIGS. 16A and 16B illustrate the displayed images of the left rear-and-side directions displayed on the display device 20L. FIG. 16A illustrates one example of the displayed image of the left rear-and-side directions when the shift range is the D-range. FIG. 16B illustrates one example of the displayed image of the left rear-and-side directions when the shift range is the R-range and the steering is being operated in the right direction.

That is, when the driver changes the shift range from the D-range into the R-range and starts causing the vehicle 100 to travel in the reverse direction while operating the steering in the right direction, the displayed images on the display devices 20R and 20L are switched from those of FIG. 15A and FIG. 16A to those of FIG. 15B and FIG. 16B.

As shown in FIGS. 15A and 16A, when the shift range is the D-range, the display devices 20R and 20L display the normal-case displayed images, as the displayed image of the right rear-and-side directions and the displayed image of the left rear-and-side directions, respectively.

On the other hand, when the shift range has been changed from the D-range to the R-range and the steering has been operated in the right direction, as shown in FIG. 15B, the display device 20R displays the wide-range displayed image as the displayed image of the right rear-and-side directions. However, as shown in FIG. 16B, the display device 20L continues to display the normal-case displayed image as the displayed image of the left rear-and-side directions. That is, only the displayed image of the right rear-and-side directions (the displayed image on the display device 20R) corresponding to the steering direction (the right direction) is switched into the wide-range displayed image when the condition in the example shown in FIG. 6 (i.e., the determination condition in step S1201) is satisfied.

Note that, when the shift range has been changed from the D-range into the R-range and the steering has been operated in the left direction, only the displayed image of the left rear-and-side directions (the displayed image on the display device 20L) corresponding to the steering direction (the left direction) is switched into the wide-range displayed image in the manner reverse to the example shown in FIGS. 15A and 15B and FIGS. 16A and 16B.

Thus, when the driver causes the vehicle 100 to travel in the reverse direction, the electronic mirror apparatus 1 according to the variant displays an image corresponding to an imaging range different from that in a case where the driver causes the vehicle 100 to travel in the forward direction, on the display device 20L or 20R corresponding to the steering direction (the left direction or the right direction). Thereby, the driver can more easily cause the vehicle 100 to travel in the reverse direction while checking the rear-and-side directions of the vehicle 100. Actually, when the driver causes the vehicle 100 to travel in the reverse direction while operating the steering, the vehicle 100 travels in the reverse direction while turning around the turning center that is on the steering direction side. At this time, the driver mainly checks the relationship with an obstacle, a white line, or so, in the inside of the turning (i.e., on the turning center side), while supplementarily checking the relationship with an obstacle, a white line, or so, in the outside of the turning, in many cases. Therefore, the driver can easily and positively check an obstacle or so in the rear-and-side directions on the steering direction side of the vehicle 100, as a result of an image corresponding to an imaging range different from that in a case where the driver causes the vehicle 100 to travel in the forward direction being displayed as the displayed image of the state in the rear-and-side directions on the steering direction side. Thus, it is possible to improve the convenience of the driver. On the other hand, the displayed image displaying the state in the rear-and-side directions on the side opposite to the steering direction side is kept unchanged in the same way as that in a case where the driver causes the vehicle 100 to travel in the forward direction (the normal-case displayed image). Thus, it is possible to reduce wrong feeling that the driver may otherwise feel due to the displayed image being switched or so when, for example, the driver supplementarily checks an obstacle or so.

Also in a case where the near-rear-wheel displayed image is displayed (the second embodiment) or the white-line-bird's-eye-view image is displayed (the third embodiment), it is advantageous that the near-rear-wheel displayed image or the white-line-bird's-eye-view image is displayed only as the displayed image on the display device 20L or 20R corresponding to the steering direction in the same way. Also in a case where a sequence of processes of switching the displayed image is carried out (the fourth embodiment) when the driver causes the vehicle 100 to travel in the reverse direction, it is advantageous that a sequence of processes of switching the displayed image is carried out only as the displayed image on the display device 20L or 20R corresponding to the steering direction in the same way. Thus, it is possible to acquire the same functions and advantageous effects.

Next, a process of the electronic mirror apparatus 1 (the processing parts 12L and 12R) according to the variant will be described in detail.

Figure 17A:
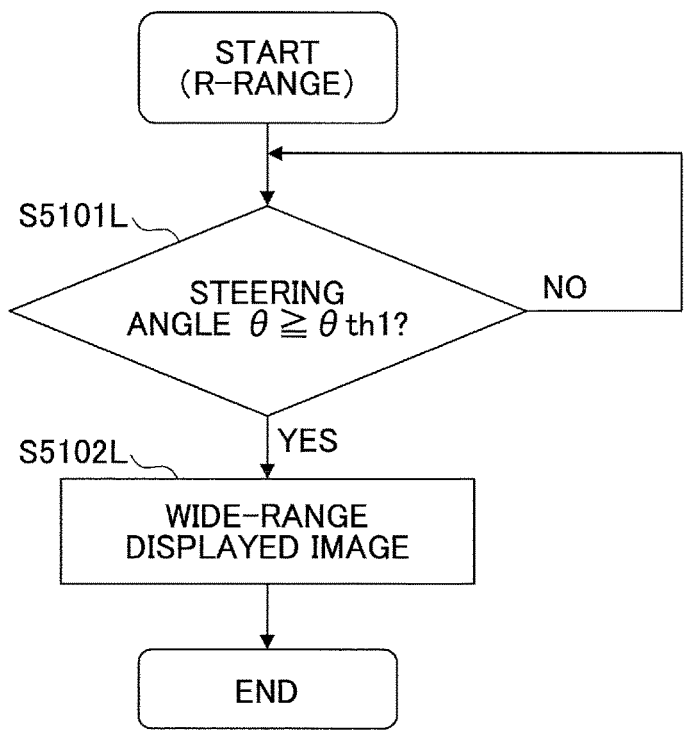
FIGS. 17A and 17B are flowcharts conceptually illustrating examples of processes carried out by the electronic mirror apparatus (the processing part) according to the variant.
Figure 17B:
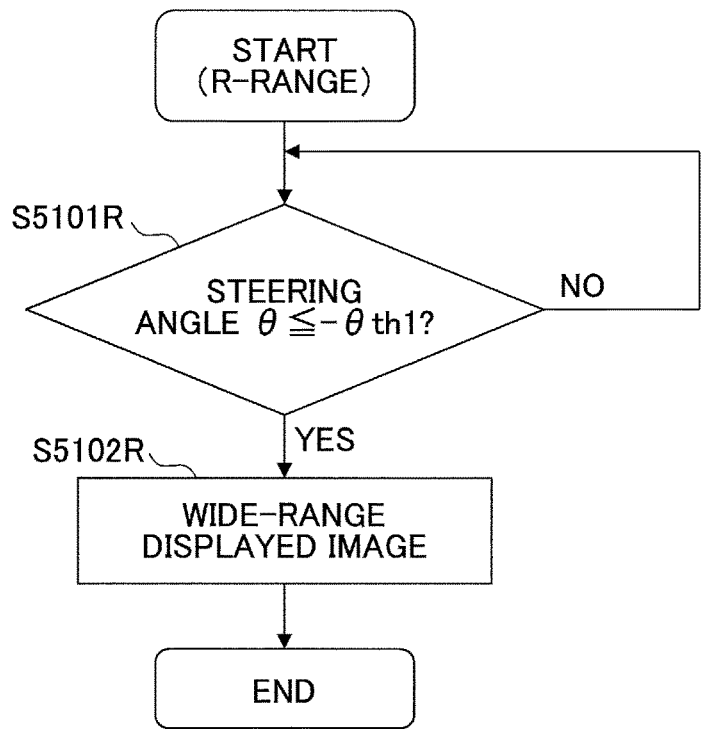

FIGS. 17A and 17B are flowcharts conceptually illustrating one example of a process of the electronic mirror apparatus 1 (the processing parts 12L and 12R) according to the variant. FIG. 17A is a flowchart illustrating one example of a process of the processing part 12L corresponding to the display device 20L displaying the displayed image of the left rear-and-side directions. FIG. 17B is a flowchart illustrating one example of a process of the processing part 12R corresponding to the display device 20R displaying the displayed image of the right rear-and-side directions.

Note that FIGS. 17A and 17B are flowcharts corresponding to FIG. 6 according to the first embodiment. Also, the process of the flowchart is carried out when the shift range is changed into the R-range during a period of time from IG-ON through IG-OFF of the vehicle 100. Also, when the shift range is changed into a range other than the R-range during the process of the flowchart being carried out, the processing parts 12L and 12R terminate the processes of the flowchart and display the respective normal-case displayed images on the display devices 20L and 20R, respectively.

Note that, as described above, when the steering direction is the left direction, the steering angle θ has a positive value, whereas, when the steering direction is the right direction, the steering angle θ has a negative value.

First, as shown in FIG. 17A, in step S5101L, the processing part 12L determines whether the steering angle θ based on the steering angle signal received from the steering angle sensor 40 is greater than or equal to the predetermined threshold θth1. If the steering angle θ is less than the predetermined threshold θth1 (NO in step S5101L), the processing part 12L repeats the determination. If the steering angle θ is greater than or equal to the predetermined threshold θth1, the processing part 12L proceeds to step S5102L.

In step S5102L, the processing part 12L displays the wide-range displayed image as the displayed image of the left rear-and-side directions on the display device 20L, and finishes the current process.

As shown in FIG. 17B, in step S5101R, the processing part 12R determines whether the steering angle θ based on the steering angle signal received from the steering angle sensor 40 is less than or equal to a predetermined threshold −θth1. If the steering angle θ is greater than the predetermined threshold −θth1 (NO in step S5101R), the processing part 12R repeats the determination. If the steering angle θ is less than or equal to the predetermined threshold −θth1, the processing part 12R proceeds to step S5102R.

In step S5102R, the processing part 12R displays the wide-range displayed image as the displayed image of the right rear-and-side directions on the display device 20R, and finishes the current process.

Thus, according to the variant, the processing part 12L determines the condition concerning the steering angle θ in the positive direction (the left direction), whereas the processing part 12R determines the condition concerning the steering angle θ in the negative direction (the right direction). Thereby, it is possible to display an image corresponding to an imaging range different from one in a case where the driver causes the vehicle 100 to travel in the forward direction, only on the display device 20L or 20R corresponding to the steering direction (the left direction or the right direction).

Note that, also concerning each of the example shown in FIG. 7 according to the first embodiment, the example shown in FIG. 9 according to, the second embodiment and the example shown in FIG. 12 according to the third embodiment, it is possible that the respective processing parts 12L and 12R determine the conditions concerning the steering angle θ in the different directions in the same way. Thereby, it is possible to acquire the same functions and advantageous effects.

Also concerning each of the examples shown in FIG. 5 according to the first embodiment, the example shown in FIG. 10 according to the second embodiment, the example shown in FIG. 13 according to the third embodiment, and the example shown in FIG. 14 according to the fourth embodiment, it is possible that the respective processing parts 12L and 12R determine in parallel whether the steering angle is positive or negative. Thereby, it is possible to acquire the same functions and advantageous effects.

Thus, the electronic mirror apparatuses have been described in the embodiments and the variants. However, the present invention is not limited to such specific embodiments and variants. Various modifications can be made without departing from the claimed invention.

For example, in the above-described embodiments and variants, a predetermined area (for example, the first area, or so) is extracted from the entirety of a taken image of a fixed imaging range taken by each camera (the imaging part), and thus, an image corresponding to a different imaging range (i.e., an angle of view, an imaging direction, or so) is displayed on the corresponding display part. That is, by changing the position and the size of an area to be displayed extracted from the entirety of a taken image of a fixed imaging range taken by each camera (the imaging part), an image corresponding to a different imaging range (i.e., an angle of view, an imaging direction, or so) is displayed on the corresponding display device. However, the present invention is not limited thereto. For example, it is also possible that each imaging part has a zooming function (zooming in and zooming out function) and a function of changing the imaging direction. Then, it is possible that the imaging range is changed appropriately using the functions, the thus taken image is displayed on the corresponding display device, and thus, an image corresponding to a different imaging range is displayed. Also in this case, it is possible to acquire the same functions and advantageous effects as those of the above-described embodiments and variants.

Also, in the above-described embodiments and variants, the states in the rear-and-side directions on both left and right sides of the vehicle 100 are displayed by the electronic mirror apparatus. However, it is also possible that the electronic mirror apparatus displays the state in the rear-and-side directions on at least either one of the left and right sides of the vehicle 100.

Also, in the above-described embodiments and variants, the processing parts generating the displayed images displayed on the display devices are mounted inside the cameras, respectively (see FIG. 1). However, it is also possible that, the processing parts generating the displayed images displayed on the display devices are mounted inside the display parts, respectively, or the processing parts generating the displayed images displayed on the display devices are configured in a form of a separate part(s) other than the cameras and the display devices.

Also, in the above-described embodiments and variants, the two processing parts are provided, i.e., one thereof generating the displayed image of the state in the left rear-and-side directions of the vehicle and the other generating the displayed image indicating the state indicating the right rear-and-side directions of the vehicle. However, it is also possible that a single processing part generates the respective displayed images indicating the states in the left and right rear-and-side directions of the vehicle.

Also, in the above-described embodiments and variants, the two display parts are provided, i.e., one thereof displaying the state in the left rear-and-side directions of the vehicle and the other displaying the state in the right rear-and-side directions of the vehicle. However, it is also possible that the display screen of a single display device has two display areas, one thereof displaying the state in the left rear-and-side directions of the vehicle and the other displaying the state in the right rear-and-side directions of the vehicle.

According to the embodiments and variants, depending on whether a vehicle travels in a forward direction or a reverse direction, ranges in rear-and-side directions on left and right sides of the vehicle displayed on display parts are changed appropriately. Thus, it is possible to provide an electronic mirror apparatus with which it is possible to improve the convenience of a driver.

The present application is based on and claims the benefit of priority of Japanese Priority Application No. 2014-266325, filed on Dec. 26, 2014, the entire contents of which are hereby incorporated herein by reference.

What is claimed is:

1. An electronic mirror apparatus comprising:
a camera mounted at one-side or each of both-side surfaces of a vehicle, the camera including
an imaging part taking an image in a rear-and-side directions of the vehicle, and
a processing part coupled to the imaging part; and
a display part mounted in the vehicle interior and coupled to the processing part of the camera and configured to display images,
wherein the processing part is programmed to:
transform a taken image taken by the imaging part to a transformed image, the taken image having a wider angle of view than the transformed image,
transmit the transformed image to the display part to cause the display part to display the transformed image when a shift position of the vehicle is a forward position, and transmit the taken image to the display part to cause the display part to display the taken image when the shift position is a reverse position and a duration of the reverse position is greater than or equal to a predetermined period of time, transmit the taken image to the display part to cause the display part to display the taken image when the shift position is the reverse position and an absolute value of a steering angle of the vehicle is greater than or equal to a first threshold, transmit the taken image to the display part to cause the display part to display the taken image when the shift position is the reverse position, the absolute value of the steering angle is greater than or equal to the first threshold, and the vehicle speed is less than or equal to a predetermined speed, and transmit the taken image to the display part to cause the display part to display the taken image when the shift position is the reverse position, the duration of the reverse position is greater than or equal to the predetermined period of time, and the vehicle speed is less than or equal to the predetermined speed.

2. The electronic mirror apparatus as claimed in claim 1, wherein the processing part transforms the taken image taken by the imaging part to a transformed image by changing a position and a size of a displaying area extracted from the taken image.

3. The electronic mirror apparatus as claimed in claim 1, wherein the transformed image is a first transformed image, and the processing part is programmed to:

transform the taken image taken by the imaging part to a second transformed image, the second transformed image corresponding to an imaging range in an imaging direction different from an imaging direction of the first transformed image and the second transformed image including a rear wheel of the vehicle and a road surface adjacent to the rear wheel, transform the taken image taken by the imaging part to a third transformed image, the third transformed image corresponding to an imaging range in an imaging direction different from an imaging direction of the first transformed image, and the third transformed image being a bird's-eye view including the rear wheel of the vehicle and the road surface adjacent to the rear wheel, transmit the second transformed image to the display part to cause the display part to display the second transformed image when the shift position is the reverse position and an absolute value of a steering angle of the vehicle is greater than or equal to a second threshold, and transmit the second transformed image to the display part to cause the display part to display the second transformed image when the shift position is the reverse position and the moving distance of the vehicle in the reverse position is greater than or equal to a first predetermined distance, transmit the third transformed image to the display part to cause the display part to display the third transformed image when, during a continuation of a state where the shift position is the reverse position, the absolute value of the steering angle of the vehicle becomes less than or equal to a fourth threshold that is less than a third threshold after the absolute value of the steering angle of the vehicle becomes greater than or equal to the third threshold, and transmit the third transformed image to the display part to cause the display part to display the third transformed image when, during the continuation of the state where the shift position is the reverse position, the absolute value of the steering angle of the vehicle becomes less than or equal to the fourth threshold after the moving distance of the vehicle in the reverse position becomes greater than or equal to a second predetermined distance.

4. An electronic mirror apparatus comprising:

a camera mounted at one-side or each of both-side surfaces of a vehicle, the camera including
 an imaging part taking an image in a rear-and-side directions of the vehicle, and
 a processing part coupled to the imaging part; and
a display part mounted in the vehicle interior and coupled to the processing part of the camera and configured to display images, wherein the processing part is programmed to:

transform a taken image taken by the imaging part to a first transformed image and a second transformed image, the second transformed image corresponding to an imaging range in an imaging direction different from an imaging direction of the first transformed image, and the second transformed image being a bird's-eye view including a rear wheel of the vehicle and a road surface adjacent to the rear wheel, transmit the first transformed image to the display part to cause the display part to display the first transformed image when a shift position of the vehicle is a forward position, transmit the second transformed image to the display part to cause the display part to display the second transformed image when, during a continuation of a state where the shift position is the reverse position, the absolute value of the steering angle of the vehicle becomes less than or equal to a fourth threshold that is less than a third threshold after the absolute value of the steering angle of the vehicle becomes greater than or equal to the third threshold, and transmit the second transformed image to the display part to cause the display part to display the second transformed image when, during the continuation of the state where the shift position is the reverse position, the absolute value of the steering angle of the vehicle becomes less than or equal to the fourth threshold after the moving distance of the vehicle in the reverse position becomes greater than or equal to a second predetermined distance.

5. The electronic mirror apparatus as claimed in claim 4, wherein the processing part transforms the taken image taken by the imaging part to a first transformed image and a second transformed image by changing a position and a size of a displaying area extracted from the taken image.

* * * * *